(12) United States Patent
Kim et al.

(10) Patent No.: US 8,559,509 B2
(45) Date of Patent: Oct. 15, 2013

(54) WAVELET TRANSFORM APPARATUS AND METHOD BASED ON PREDICTION-UPDATE LIFTING SCHEME, AND ADAPTIVE PREDICTION APPARATUS AND METHOD AND RECORDING MEDIUM FOR THE SAME

(75) Inventors: Hayoon Kim, Gyeonggi-do (KR); Yoonsik Choe, Gyeonggi-do (KR); Yonggoo Kim, Seoul (KR); Yungho Choi, Gyeonggi-do (KR); Jinwoo Jung, Seoul (KR); Byongho Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 373 days.

(21) Appl. No.: 13/055,671

(22) PCT Filed: Jul. 16, 2009

(86) PCT No.: PCT/KR2009/003912
§ 371 (c)(1),
(2), (4) Date: Apr. 13, 2011

(87) PCT Pub. No.: WO2010/011050
PCT Pub. Date: Jan. 28, 2010

(65) Prior Publication Data
US 2011/0182358 A1    Jul. 28, 2011

(30) Foreign Application Priority Data

Jul. 23, 2008   (KR) .................. 10-2008-0071564
Aug. 11, 2008   (KR) .................. 10-2008-0078457

(51) Int. Cl.
*H04B 1/66*   (2006.01)
(52) U.S. Cl.
USPC .................................... 375/240.12
(58) Field of Classification Search
USPC .................................... 375/240.12
See application file for complete search history.

(56) References Cited

U.S. PATENT DOCUMENTS

2006/0008164 A1 *   1/2006   Wu et al. ................ 382/240

FOREIGN PATENT DOCUMENTS

KR   1020000041990   7/2000
KR   10-0311573      9/2001

OTHER PUBLICATIONS

International Search Report mailed Mar. 11, 2010 for PCT/KR2009/003912, citing the above references.
Bryan E Usevitch, A Tutorial on Modern Lossy Wavelet Image Compression: Foundations of JPEG 2000, IEEE Signal Processing Magazine, Sep. 30, 2001, pp. 22-35.

* cited by examiner

*Primary Examiner* — Christopher S Kelley
*Assistant Examiner* — Zhen Jessica Li
(74) *Attorney, Agent, or Firm* — Lowe Hauptman & Ham, LLP

(57) ABSTRACT

The present disclosure relates to a wavelet transform apparatus and method based on a prediction-update lifting scheme, and an adaptive prediction apparatus and method and a recording medium for the same. The disclosure comprises the steps of: setting first updated even polyphase samples influenced when being updated from corresponding odd polyphase samples, setting plural candidate groups for prediction direction based on the set first updated even polyphase samples, selecting a first prediction direction from the candidate groups to minimize the energy in a high band, obtaining a first prediction value based on the first prediction direction and the updated even polyphase samples corresponding to the first prediction direction, and obtaining residual odd polyphase samples by deducting the first prediction value from the corresponding odd polyphase samples. Therefore, the present disclosure is able to increase encoding efficiency by minimizing energy transfer to a high band signal when removing the spatial correlation within an image using a directional wavelet transform designed based on the prediction-update lifting scheme.

45 Claims, 24 Drawing Sheets

WAVELET TRANSFORM APPARATUS AND METHOD BASED ON PREDICTION-UPDATE LIFTING SCHEME, AND ADAPTIVE PREDICTION APPARATUS AND METHOD AND RECORDING MEDIUM FOR THE SAME

CROSS REFERENCE TO RELATED APPLICATION

This application claims the priority of Korean Patent Application No. 10-2008-0071564, filed on Jul. 23, 2008 and No. 10-2008-0078457, filed on Aug. 11, 2008, in the KIPO (Korean Intellectual Property Office), the disclosure of which are incorporated herein in their entirety by reference. Further, this application is the National Phase application of International Application No. PCT/KR2009/003912, filed Jul. 16, 2009, which designates the United States and was published in Korean. Each of these applications is hereby incorporated by reference in their entirety into the present application.

TECHNICAL FIELD

The present disclosure relates to a video data compression technique. More particularly, the present disclosure relates to a wavelet transform apparatus and method based on a prediction-update lifting scheme, and an adaptive prediction apparatus and method and a recording medium for the same, which are capable of effectively removing the residual of high-band signals when removing a spatial correlation between images by using wavelet transform that is designed based on an prediction-update lifting scheme, in order to increase the coding efficiency of a wavelet transform-based video data compression technique. Additionally, the present disclosure relates to a wavelet transform apparatus and method based on a prediction-update lifting scheme, and an adaptive prediction apparatus and method and a recording medium for the same, which are capable of doing predictions in even more directions than conventional methods while effectively limiting the resultant increase of calculation quantity without affecting the coding efficiency when performing a directional prediction for effectively removing a spatial correlation between images having multi-directional lines, edges, and contours by using wavelet transform that is designed based on the prediction-update lifting scheme, in order to increase the coding efficiency of a wavelet transform-based video data compression technique.

BACKGROUND ART

The statements in this section merely provide background information related to the present disclosure and may not constitute prior art.

Generally, wavelet transform-based video data compression technique provides a solution to the blocking artifacts caused by conventional JPEG and other block-centered data processing methods, and is anticipated to be an excellent technique to provide the scalability and progressive transmission adapting to the transmission and storage medium atmosphere as it is being applied to the recent international standard JPEG2000 and Dirac, which is a video compression technique developed by British BBC.

A wavelet transform method is a method for recursively transforming image signals in a space region into those in a wavelet region using two one-dimensional filters, including a low band filter and a high band filter, in the horizontal and vertical directions of an input image. The wavelet transform method has a high energy concentration effect for flat image signals because it can provide sufficient directional vanishing moments in the horizontal and vertical directions, that is, the filtering directions.

Here, the directional vanishing moments refer to the state in which the energy of a wavelet transform coefficient is sufficiently collected in a low subband, thereby minimizing the transfer of energy in the direction of high band filtering.

There have been recently proposed discrete wavelet transform techniques that take the characteristics of images into consideration because it is recognized that a standard discrete wavelet transform scheme has a limitation on the production of a sufficient energy concentration effect along lines, edges and contours, that is, the intrinsic characteristics of image signals.

A fundamental reason for this trend will be described in more detail. In an existing discrete wavelet transform scheme, a wavelet transform is performed based on the filtering in both the horizontal and the vertical directions. Accordingly, in the case where the contours or edges of images are determined to have directions other than the two directions, sufficient directional vanishing moments cannot be provided for high-pass signals.

[Document 1] Roberto H. Bamberger, and Mark J. T. Smith (A Filter Bank for the Directional Decomposition of Images: Theory and Design, IEEE Trans. On Signal Processing, vol. 40, no. 4, pp. 882-893, April, 1992)

[Document 2] E. J. Candes ("Ridgelets: Theory and applications, Ph.D. dissertation, Dept. Statistics, Stanford Univ., Stanford, Calif., 1998)

[Document 3] E. J. Candes and D. L. Donoho ("Curvelets a surprisingly effective nonadaptive representation for objects with edges", in Curve and Surface Fitting, A Choen, C. Rabut, L. L. Schmumaker, Eds. SaintMalo: Vanderbit University Press, 1999)

In order to solve the above-described problem, [Document 1] attempts to provide directional vanishing moments for a high-pass signal by using a filter bank having frequency responses for a variety of directions, not only the horizontal and vertical directions. [Document 2] and [Document 3] can significantly reduce the energy of a high band filter band by transforming two-dimensional continuous signals based on the characteristic information (lines and curves) of images.

[Document 4] Omer N. Gerek and A. Enis Cetin ("A 2-D Orientation-Adaptive Prediction Filter in Lifting Structures for Image Coding", IEEE Trans. Image Processing, vol. 15, no. 1, pp. 106-111, January 2006)

However, the above-described methods are problematic in that they exact an excessive computational load because they cannot be independently implemented as a one-dimensional filter, as in existing wavelets.

In order to reduce the energy of the high band filter band while solving the problems as described above, [Document 4] proposes a prediction method using a 2-dimensional prediction filter of the edge direction based on the prediction-update lifting.

FIGS. 1 and 2 are block diagrams of a conventional lifting-based wavelet transform apparatus.

The conventional lifting-based wavelet transform apparatus includes an analysis unit 10 shown in FIG. 1 and an integration unit 20 shown in FIG. 2. The analysis unit 10 transforms an input signal into a wavelet coefficient, and the integration unit 20 transforms the wavelet coefficient into a reconstruction signal.

The analysis unit 10 includes a decomposer 11, a predictor 13, and an updater 15 as shown in FIG. 1, and the integration unit 20 includes an updater 21, a predictor 23, and a composition unit 25 as shown in FIG. 2.

In one-dimensional wavelet transform, the decomposer 11 decomposes a one-dimensional signal into even and odd polyphase samples, and the predictor 13 predicts the plurality of odd polyphase samples based on a plurality of surrounding even polyphase samples, and subtracts the predicted value from the odd polyphase samples, thereby calculating the residual polyphase samples.

Finally, the updater 15 predicts even polyphase samples based on the calculated residual polyphase samples and adds the predicted value to the even polyphase samples, thereby creating updated polyphase samples.

In this case, if a filter having a form specific to prediction and update is used, the updated even polyphase samples become a wavelet coefficient that has passed through a low band filter and the predicted odd polyphase samples (residual polyphase samples) become a wavelet coefficient that has passed through a high band filter. The wavelet coefficients can be reconstructed to the original signal again by the integration unit 20 of FIG. 2.

The lifting based wavelet as described above can be extended and applied to a two-dimensional signal. That is, a wavelet transform is performed on a two-dimensional signal in such a way as to perform decomposition/prediction/update on the two-dimensional signal in the vertical direction and then perform decomposition/prediction/update on created updated polyphase samples and residual polyphase samples again in the horizontal direction.

While the conventional lifting-based wavelet transform apparatus employs a lifting scheme in which the wavelet is implemented in the order of division, prediction, and update as described above, the wavelet is performed in the sequence of division, update, and prediction in the prediction-update lifting scheme.

[Document 4] has enabled a removal of energy in a high band more than the simple wavelet of a two-dimensional signal by employing a directional prediction in the prediction-update lifting based wavelet. That is to say, [Document 4] has tried to reduce the energy of the high band based on the prediction-update lifting based wavelet. The method of [Document 4] will now be described below.

Each one-dimensional wavelet is decomposed into odd and even polyphase samples along the horizontal direction. Then, the even polyphase samples are updated in the horizontal direction by using the odd polyphase samples. That is, the even polyphase samples are updated by the odd polyphase samples located at the left and right of the even polyphase samples. Then, the odd polyphase samples are predicted by adjacent updated even polyphase samples. In order to enhance the efficiency of the prediction, not only the even polyphase samples located in the horizontal direction of the odd polyphase samples but also the even polyphase samples located in the diagonal direction of the odd polyphase samples may be used in the prediction. In other words, if the edge is located in the diagonal direction, a prediction using even polyphase samples located in the diagonal direction (+45 degrees, −45 degrees) may be superior to a prediction using even polyphase samples located in the left and right sides of the odd polyphase samples. Therefore, although the prediction is performed only in the horizontal direction (0 degrees) in the conventional method, the prediction is performed in three directions including +45 degrees, 0 degrees, and −45 degrees in the method of [Document 4].

When the lifting in the horizontal direction is complete, the lifting is performed again in the vertical direction according to the method as described above.

The reason why the updating is performed only in the horizontal or vertical direction is in order to properly remove aliasing of the updated even polyphase samples since the updated even polyphase samples should recursively perform the wavelet decomposition again.

[Document 4] effectively removes high band energy by performing the prediction in consideration of the direction of the edges. However, it is problematic in that, when the prediction direction is a diagonal direction, the prediction is performed without using the information of the updated even polyphase samples containing the information of the odd polyphase samples to be predicted. Further, since the directions are limited to only +45 degrees, −45 degrees, and 0 degrees, it is impossible to process all of the various directions of the edges, which degrades the efficiency.

DISCLOSURE

Technical Problem

Therefore, the present disclosure has been made for a technical solution of the above problems of the prior arts, and the present disclosure is to provide a scheme for effectively preventing the degradation of prediction efficiency due to non-use of information of updated even polyphase samples containing information of odd polyphase samples to be predicted, when wavelet transform designed based on a prediction-update lifting scheme is used and a directional prediction technology is used in order to minimize energy in a high band signal.

In addition, the present disclosure is to provide a scheme for performing a prediction in more directions than the prior arts that have only the limited three prediction directions of +45 degrees, 0 degrees, and −45 degrees and thus have difficulty in providing exact prediction values for edges or contours having the other directions.

Further, the present disclosure is to provide a technology, which can perform a prediction in more directions than the prior arts and can effectively remove the spatial correlation by adaptively using various prediction direction candidate groups while preventing the operation quantity increase due to the prediction direction increase.

Technical Solution

In order to achieve the above objects, the present disclosure provides a wavelet transform apparatus and method based on a prediction-update lifting scheme, and an adaptive prediction apparatus and method and a recording medium for the same, which enable various predictions using samples around a current sample to be predicted, which have been influenced during a previous updating process by the current sample, in a prediction process after an update process in the prediction-update lifting-based directionality prediction technique.

One aspect of the present disclosure provides a wavelet transform apparatus based on a prediction-update lifting scheme, including: a decomposer for decomposing an input signal into first even polyphase samples and first odd polyphase samples; an updater for calculating a first prediction value by predicting even polyphase samples from the first odd polyphase samples and calculating updated even polyphase samples by adding the first prediction value to the first even polyphase samples; and a predictor for calculating a second prediction value by predicting odd polyphase samples from the updated even polyphase samples and calculating residual odd polyphase samples by subtracting the second prediction value from the first odd polyphase samples, wherein the predictor configures a plurality of prediction direction candidate groups centered at first updated even polyphase samples influenced when being updated from a corresponding odd polyphase sample to be predicted, selects a first prediction direction for minimizing energy in a high band from a plurality of configured prediction direction candidate groups, and calculates the second prediction value based on selected first prediction direction and updated even polyphase samples corresponding to the first prediction direction.

Another aspect of the present disclosure provides a wavelet transform method based on a prediction-update lifting scheme, including: decomposing an input signal into first even polyphase samples and first odd polyphase samples; calculating a first prediction value by predicting even polyphase samples from the first odd polyphase samples and calculating updated even polyphase samples by adding the first prediction value to the first even polyphase samples; and calculating a second prediction value by predicting odd polyphase samples from the updated even polyphase samples and calculating residual odd polyphase samples by subtracting the second prediction value from the first odd polyphase samples, wherein the step of calculating the second prediction value and the residual odd polyphase samples comprises: configuring a plurality of prediction direction candidate groups centered at first updated even polyphase samples influenced when being updated from a corresponding odd polyphase sample to be predicted; selecting a first prediction direction for minimizing energy in a high band from a plurality of configured prediction direction candidate groups; and calculating the second prediction value based on selected first prediction direction and updated even polyphase samples corresponding to the first prediction direction.

Yet another aspect of the present disclosure provides an adaptive prediction apparatus for predicting an odd polyphase sample from updated even polyphase samples by a wavelet transform based on a prediction-update lifting scheme, including: a prediction sample influence determiner for configuring first updated even polyphase samples influenced when being updated from an odd polyphase sample to be predicted; a prediction direction selector for configuring plural prediction direction candidate groups centered on the first updated even polyphase samples and selecting a first prediction direction for minimizing energy in a high band from configured plural prediction direction candidate groups; and a predictor for calculating a first prediction value based on the first prediction direction and updated even polyphase samples corresponding to the first prediction direction and calculating residual odd polyphase samples by subtracting the first prediction value from corresponding odd polyphase samples.

Yet another aspect of the present disclosure provides an adaptive prediction method for predicting an odd polyphase sample from updated even polyphase samples by a wavelet transform based on a prediction-update lifting scheme, including: configuring first updated even polyphase samples influenced when being updated from a corresponding odd polyphase sample to be predicted; configuring plural prediction direction candidate groups centered on the first updated even polyphase samples; selecting a first prediction direction for minimizing energy in a high band from configured plural prediction direction candidate groups; and calculating a first prediction value based on the first prediction direction and updated even polyphase samples corresponding to the first prediction direction and calculating residual odd polyphase samples by subtracting the first prediction value from corresponding odd polyphase samples.

Yet another aspect of the present disclosure provides a computer-readable recording medium recording a program for implementing adaptive prediction functions for predicting an odd polyphase sample from updated even polyphase samples by a wavelet transform based on a prediction-update lifting scheme, the adaptive prediction functions including: configuring first updated even polyphase samples influenced when being updated from an odd polyphase sample to be predicted; configuring plural prediction direction candidate groups centered on the first updated even polyphase samples; selecting a first prediction direction for minimizing energy in a high band from configured plural prediction direction candidate groups; and calculating a first prediction value based on the first prediction direction and updated even polyphase samples corresponding to the first prediction direction and calculating residual odd polyphase samples by subtracting the first prediction value from corresponding odd polyphase samples.

Advantageous Effects

According to the different aspects, the present disclosure can increase the coding efficiency by minimizing energy transfer to a high band signal when removing the spatial correlation within an image using a directional wavelet transform designed based on the prediction-update lifting scheme.

Further, in the directional prediction technique based on the prediction-update lifting scheme, the present disclosure can improve the prediction efficiency by using information of updated even polyphase samples containing information of the odd polyphase samples to be predicted, can provide more exact prediction values for edges or contours having various directions by departmentalizing and increasing the prediction directions, and can efficiently remove the spatial correlation by adaptively using various prediction direction candidate groups while preventing the operation quantity increase due to the prediction direction increase since the prediction direction candidate groups are adaptively and newly determined in each of the areas decomposed from an image.

MODE FOR INVENTION

Figure 1:
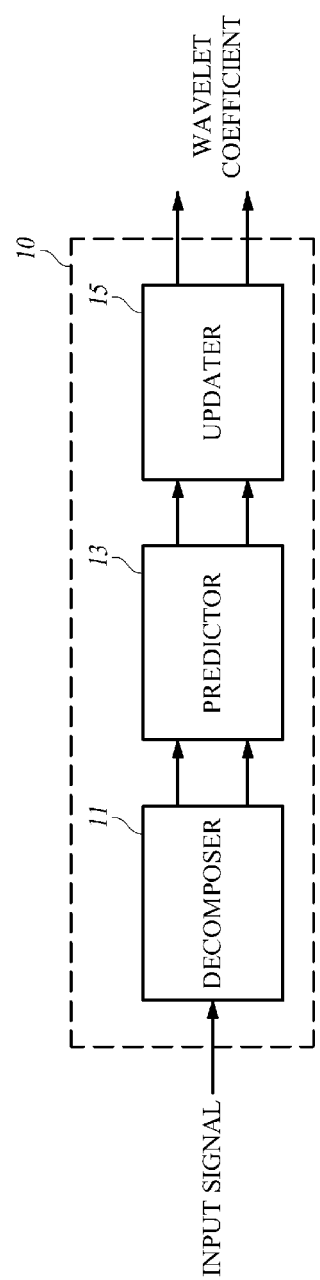
FIGS. 1 and 2 are block diagrams of a conventional lifting-based wavelet transform apparatus.
Figure 2:
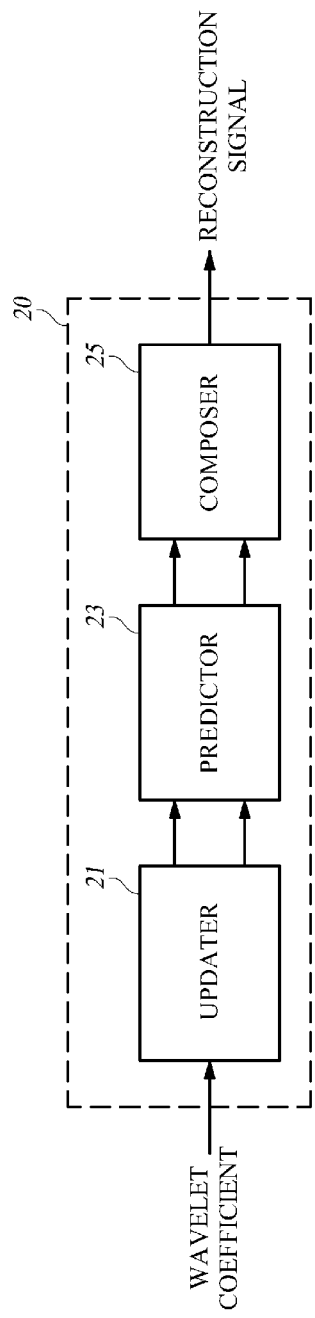

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 3:
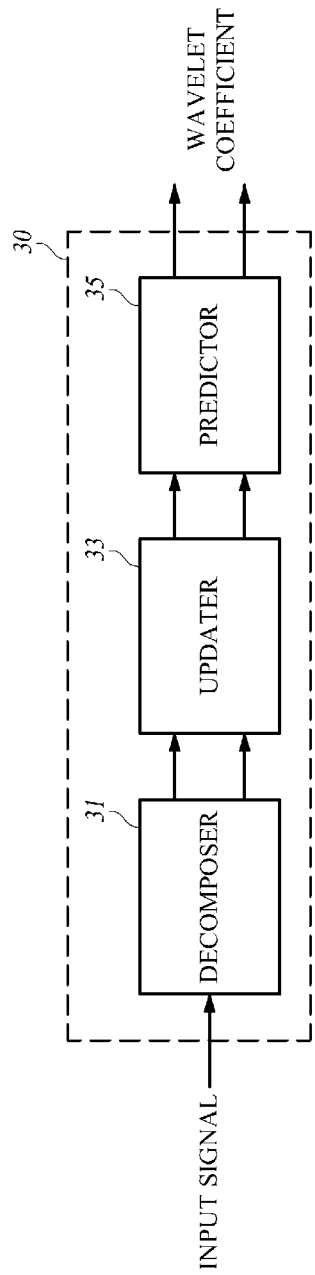
FIGS. 3 and 4 are block diagrams of a prediction-update lifting-based wavelet transform apparatus according to an aspect.
Figure 4:
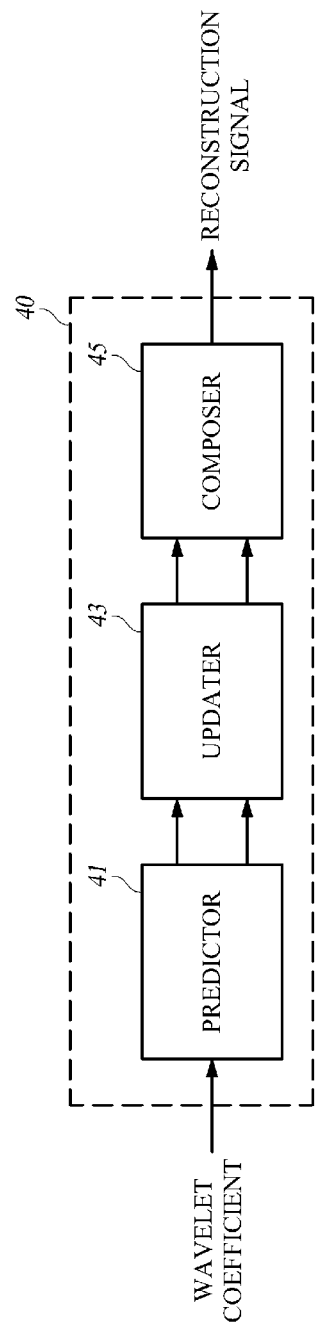

FIGS. 3 and 4 are block diagrams of a prediction-update lifting-based wavelet transform apparatus according to an aspect.

The prediction-update lifting-based wavelet transform apparatus according to an aspect of the embodiment includes an analysis unit 30 shown in FIG. 3 and an integration unit 40 shown in FIG. 4. The analysis unit 30 transforms an input signal into a wavelet coefficient, and the integration unit 40 transforms the wavelet coefficient into a reconstruction signal.

The analysis unit 30 includes a decomposer 31, an updater 33, and a predictor 35 as shown in FIG. 3, and the integration unit 40 includes a predictor 41, an updater 43, and a composition unit 45 as shown in FIG. 4.

The decomposer 31 decomposes an input signal into even polyphase samples and odd polyphase samples. The updater 33 obtains a first prediction value by predicting even polyphase samples based on the decomposed odd polyphase samples, and adds the first prediction value to the decomposed even polyphase samples, thereby creating updated even polyphase samples.

The predictor 35 obtains a second prediction value by predicting odd polyphase samples based on the updated even polyphase samples, and subtracts the second prediction value from the decomposed odd polyphase samples, thereby calculating the residual odd polyphase samples. In the following description, the predictor 35 according to the first aspect of the present disclosure and the predictor 35 according to the second aspect of the present disclosure are discriminated from each other.

The predictor 35 according to the first aspect configures a plurality of prediction direction candidate groups centered on a first even polyphase sample influenced by the updating from corresponding odd polyphase samples to be predicted, selects a first prediction direction for minimizing energy in a high band from the configured prediction direction candidate groups, obtains the second prediction value based on the selected first prediction direction and updated even polyphase samples corresponding to the first prediction direction, and subtracts the second prediction value from the decomposed odd polyphase samples, thereby calculating the residual odd polyphase samples.

The predictor 35 according to the second aspect decomposes an image into a predetermined number of areas, selects one or more odd polyphase samples in each decomposed area, selects first prediction directions for minimizing energy in a high band from a plurality of prediction direction candidate groups configured centered on a first updated even polyphase sample influenced by the updating from the selected odd polyphase samples, determines a final prediction direction candidate group among the selected first prediction directions based on a selection frequency, selects a second prediction direction for minimizing energy in a high band from the final prediction direction candidate group configured centered on a second updated even polyphase sample influenced by the updating from corresponding odd polyphase samples to be predicted with respect to each of all odd polyphase samples of each decomposed area, obtains the second prediction value based on the selected second prediction direction and updated even polyphase samples corresponding to the second prediction direction, and subtracts the second prediction value from the corresponding odd polyphase samples, thereby calculating the residual odd polyphase samples.

The predictor 35 according to the first aspect and the predictor 35 according to the second aspect configure the first or second updated even polyphase samples based on the direction of the update filter, the coefficient of the update filter, and locations of corresponding odd polyphase samples, which have been selected or are to be predicted, and the plurality of prediction direction candidate groups have directional components of $0°$, $±22.5°$, $±45°$, $±67.5°$, $±112.5°$, $±135°$, and $±157.5°$ centered on a particular sample (for example, a first updated even polyphase sample). Further, the predictor 35 according to the first aspect and the predictor 35 according to the second aspect select a prediction direction, in which a value obtained by subtracting an accumulated sum of products of a corresponding filter coefficient and a prediction direction candidate group or a final prediction direction candidate group from a weighted average sample value becomes a minimum value, as the first prediction direction or the second prediction direction. The weighted average sample value refers to a value, which is obtained by giving weights according to the distances between an odd polyphase sample to be predicted and corresponding even polyphase samples located around the odd polyphase sample to the pixel values of the even polyphase samples located around the odd polyphase sample and then averaging the weighted even polyphase samples.

Further, in the determination of the final prediction direction candidate group by the predictor 35 according to the second aspect, the number of prediction directions in the final prediction direction candidate group is determined to be smaller than the number of prediction directions in each of the prediction direction candidate groups. The prediction direction candidate group includes at least one particular directional component by default, and the particular directional component may be, for example, the directional component of 0°, which most frequently occurs in actual experiments.

If a filter having a form specific to prediction and update as described above is used, the updated even polyphase samples become a wavelet coefficient that has passed through a low band filter and the predicted odd polyphase samples (residual polyphase samples) become a wavelet coefficient that has passed through a high band filter. These wavelet coefficients can be reconstructed to the original signal again by the integration unit 40 of FIG. 4.

Like the typical lifting based wavelet, the prediction-update lifting-based wavelet as described above can also be extended and applied to a two-dimensional signal.

Thereafter, the predictor 35 of FIG. 3 will be described in more detail for the first aspect and the second aspect.

Figure 5:
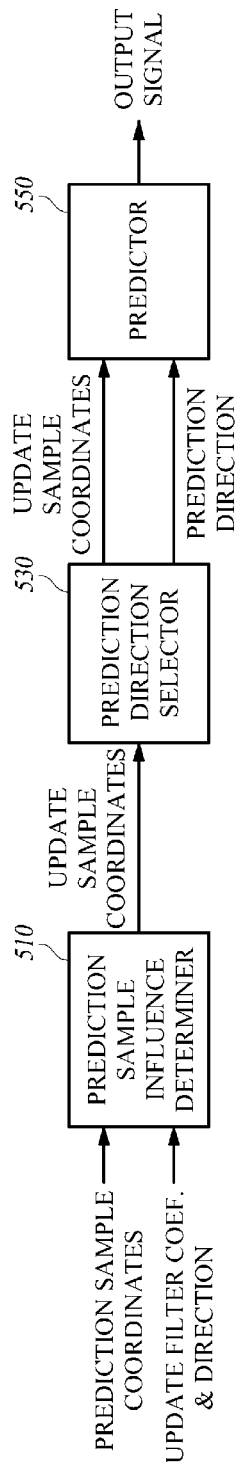
FIG. 5 is a block diagram of an adaptive prediction apparatus of a prediction-update lifting-based wavelet according to an aspect.

FIG. 5 illustrates a structure of the predictor 35 according to the first aspect in detail and shows a block diagram of an adaptive prediction apparatus of a prediction-update lifting-based wavelet according to an aspect.

As shown in FIG. 5, an adaptive prediction apparatus of a prediction-update lifting-based wavelet according to an aspect includes a prediction sample influence determiner 510, a prediction direction selector 530, and a predictor 550.

The prediction sample influence determiner 510 configures first updated even polyphase samples influenced by the updating from corresponding odd polyphase samples to be predicted in the update process of the updater 33 of FIG. 3. That is, when there is an input of update filter direction, update filter coefficient, and odd polyphase samples to be predicted, and updated even polyphase samples from the updater 33 of FIG. 3, the prediction sample influence determiner 510 calculates locations of updated samples (i.e. first updated even polyphase samples) necessary for the prediction of the odd polyphase samples by using the direction and coefficient of the update filter and the locations of the odd polyphase samples to be predicted, and configures the first updated even polyphase samples influenced at the time of updating by the odd polyphase samples to be predicted.

The prediction direction selector 530 determines an updated sample and the direction capable of minimizing the energy in the high band in consideration of the intensity and the edge direction of a current sample. In other words, the prediction direction selector 530 configures a plurality of prediction direction candidate groups centered on the first updated even polyphase samples, and selects the first prediction direction for minimizing the energy in the high band from the configured prediction direction candidate groups. An aspect for the selection of the first prediction direction will be described in more detail later.

The predictor 550 performs a prediction using a prediction filter predetermined using the updated even polyphase samples and the first prediction direction, and then computes a difference between the predicted value and the odd polyphase samples. That is, the predictor 550 obtains a prediction value based on the first prediction direction and the updated even polyphase samples corresponding to the first prediction direction, and subtracts the prediction value from corresponding odd polyphase samples, thereby obtaining residual odd polyphase samples.

Figure 6:
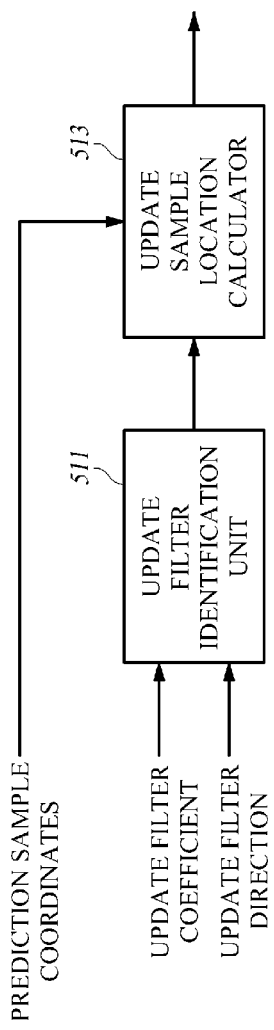
FIG. 6 is a block diagram illustrating the structure of the prediction sample influence determiner 510 of FIG. 5 in detail.

FIG. 6 is a block diagram illustrating the structure of the prediction sample influence determiner 510 of FIG. 5 in detail.

As shown in FIG. 6, the prediction sample influence determiner 510 includes an update filter identification unit 511 and an update sample location calculator 513.

The update filter identification unit 511 identifies the range of the first updated even polyphase samples based on the direction of the update filter and the coefficient of the update filter. For example, as shown in FIG. 8, when the update filter direction is transverse direction and the update filter coefficient is N (N=4), the update filter identification unit 511 identifies that the range of the first updated even polyphase samples has a transverse length of 2N (2N=8).

Figure 8:
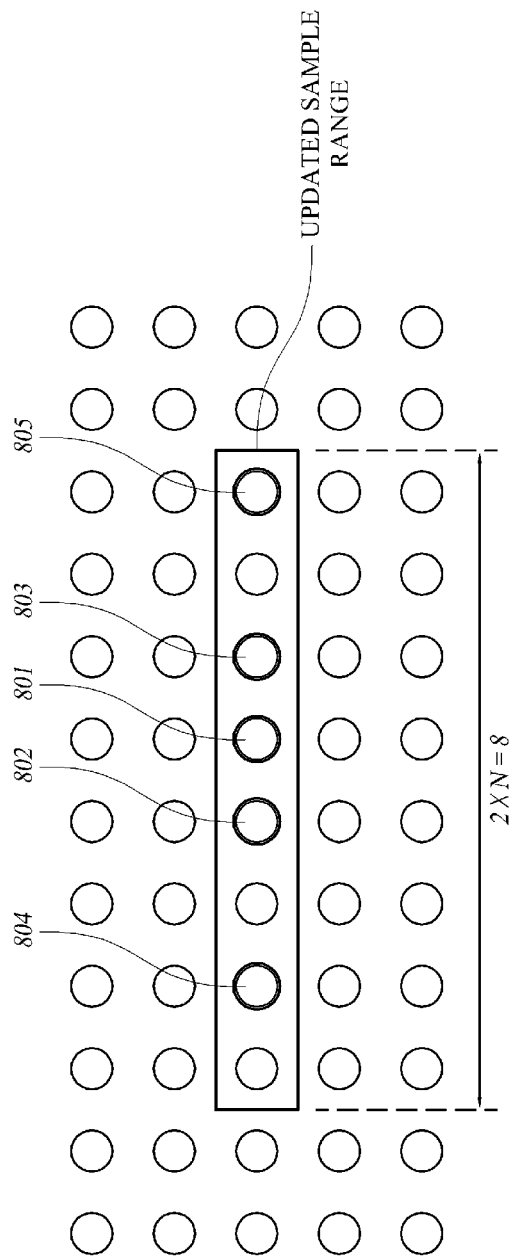
FIG. 8 is a view for illustrating the range of updated even polyphase samples usable for prediction according to an aspect.

Referring to FIG. 8, the update sample location calculator 513 applies the identified range, 2N (2N=8), to the locations of the odd polyphase samples 801 to be predicted, thereby determining the updated even polyphase samples to be used for prediction, that is, the first updated even polyphase samples 802 to 805.

Figure 7:
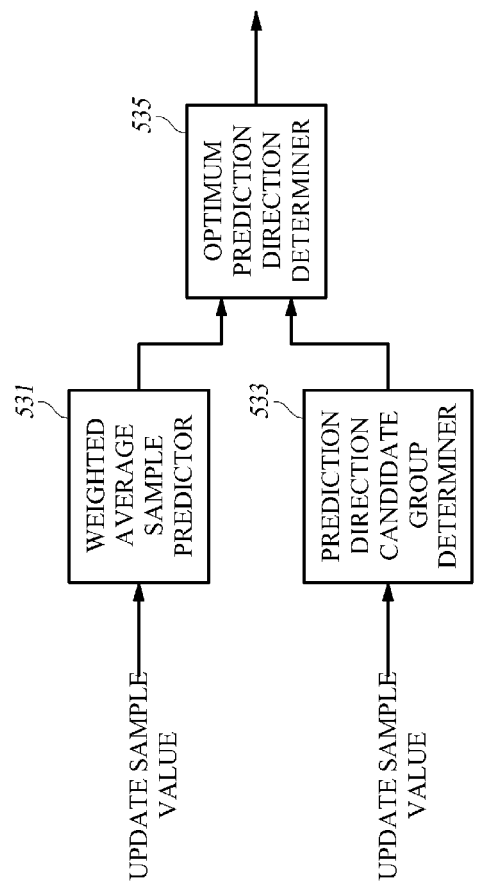
FIG. 7 is a block diagram illustrating the structure of the prediction direction selector 530 of FIG. 5 in detail.

FIG. 7 is a block diagram illustrating the structure of the prediction direction selector 530 of FIG. 5 in detail.

As shown in FIG. 7, the prediction direction selector 530 includes a weighted average sample predictor 531, a prediction direction candidate group determiner 533, and an optimum prediction direction determiner 535.

The weighted average sample predictor 531 obtains a weighted average sample value by giving weights according to the distances between an odd polyphase sample to be predicted and corresponding even polyphase samples located around the odd polyphase sample to pixel values of the even polyphase samples located around the odd polyphase sample and then averaging the weighted even polyphase samples. Specifically, referring to FIG. 9, the weighted average sample predictor 531 calculates an average of weights of the updated even polyphase samples located around the current to-be-predicted odd polyphase sample X(2m+2,2n+2), wherein the weights are calculated based on the distances from the current to-be-predicted odd polyphase sample X(2m+2,2n+2) to the neighbor updated even polyphase samples. Therefore, each of the samples X(2m+2,2n+1), X(2m+2,2n+3) has a weight of 1 because they are spaced apart by one sample from the sample X(2m+2,2n+2), while each of the samples X(2m+1,2n+1), X(2m+1,2n+3), X(2m+3,2n+1), and X(2m+3,2n+3) has a weight of $\sqrt{2}$.

Therefore, the weighted average sample predictor 531 predicts a weighted average sample $\hat{X}[2m+2,2n+2]$ through equation (1) as defined below. In equation (1), $c_i$ indicates a weight.

$$\hat{X}[2m+2, 2n+2] = \sum_{i,j \in S} c_i X[2m+i, 2n+j] \quad \text{Equation 1}$$

Figure 10:
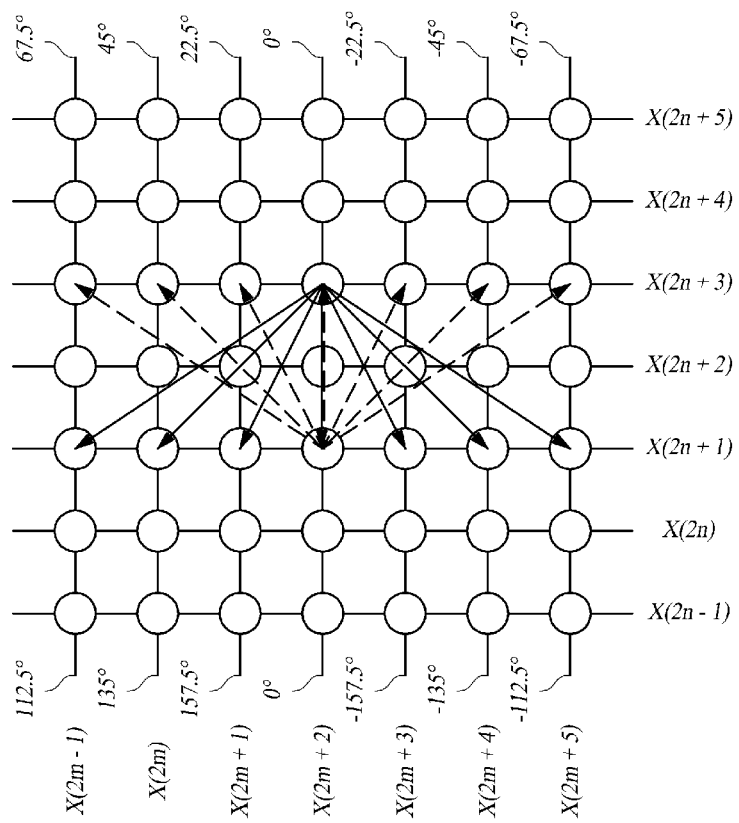
FIG. 10 is a view for illustrating a prediction direction candidate group according to an aspect.

The prediction direction candidate group determiner 533 configures multiple directional components (including directional components of 0°, ±22.5°, ±45°, ±67.5°, ±112.5°, ±135°, and)±157.5° centered on the first updated even polyphase sample as the plurality of prediction direction candidate groups, wherein the prediction direction candidate groups are determined in order to effectively remove the residual signals of a high frequency band according to the characteristics of the image signal. Although various directionalities can be provided, the present disclosure proposes 13 direction candidate groups in consideration of the complexity of the encoder. Now, a more detailed description thereof will be given with reference to FIG. 10.

Figure 13:
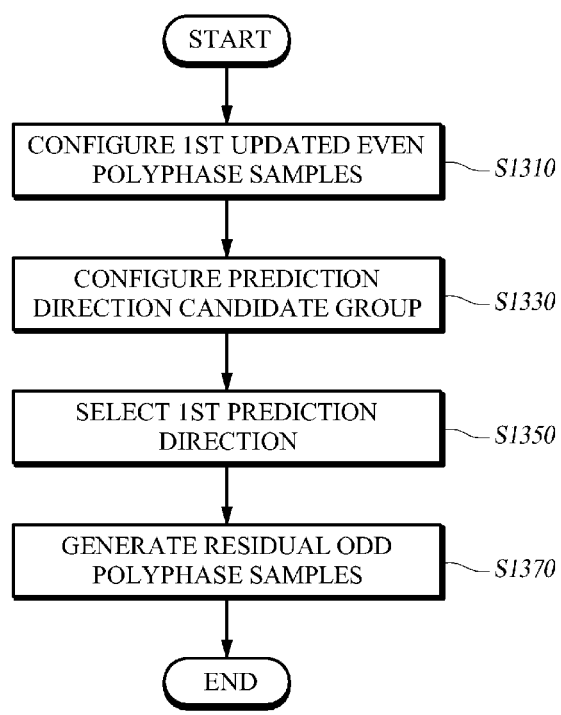
FIG. 13 is a flowchart of a wavelet transform method based on a prediction-update lifting scheme according to another aspect.

In order to enhance the coding efficiency, it is necessary to minimize the residual signals of a high band, which can be achieved by a prediction technique capable of reflecting various characteristics of an image. As shown in FIG. 13, the prediction direction candidate group determiner 533 according to the present disclosure selects prediction direction candidate groups having a total of 13 directional components centered on the first updated even polyphase samples (for example, samples X(2m+2,2n+1) and X(2m+2,2n+3) in FIG. 10) in order to achieve better reflection of the characteristics of the image. By such a selection, it is possible to efficiently express lines, edges, and contours of images, and it is possible to express 13 directional angles including 0°, ±22.5°, ±45°, ±67.5°, ±112.5°, ±135°, and ±157.5°.

The optimum prediction direction determiner 535 determines an efficient prediction direction based on results of operations of the weighted average sample predictor 531 and the prediction direction candidate group determiner 533. Specifically, the optimum prediction direction determiner 535 determines an optimum prediction direction based on sample values of the multiple prediction direction candidate groups obtained by the prediction direction candidate group determiner 533 and the weighted average sample value $\hat{X}$[2m+2, 2n+2] obtained by the weighted average sample predictor 531. The optimum prediction direction is determined by equation (2) below. According to equation (2), a prediction direction, in which a value obtained by subtracting an accumulated sum of sample values obtained by multiplying the 13 prediction direction candidate groups X[2 m+l,2n+j] by the filter coefficient Wi from the weighted average sample value $\hat{X}$[2 m+2,2n+2] becomes a minimum value, is determined as the optimum prediction.

$$\operatorname{argmin} d(i, j) = \hat{X}[2m+2, 2n+2] - \sum_{i,j} w_{i,j} X[2m+i, 2n+j] \quad \text{Equation 2}$$

That is to say, the optimum prediction direction determiner 535 maximizes the coding efficiency by selecting samples capable of minimizing equation (2) in consideration of the 13 various directions. Finally, the optimum prediction direction determiner 535 selects directions and samples proper for the image signal.

Hereinafter, an example of an adaptive prediction method of a prediction-update lifting-based wavelet transform according to the present disclosure will be described with reference to FIG. 9.

Figure 9:
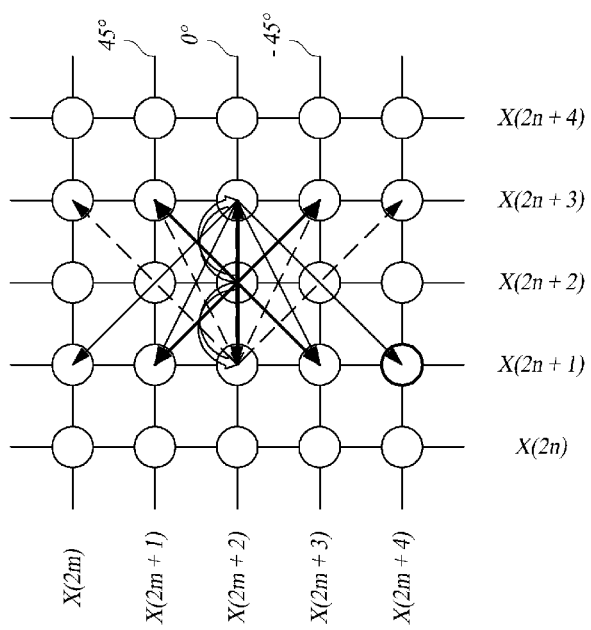
FIG. 9 is a view for illustrating an example of a prediction method according to an aspect.

FIG. 9 illustrates an example of a 5/3 lifting technique based on a prediction-update structure. Specifically, in FIG. 9, the updated even samples arranged in the even sequences correspond to pixels generated through the update process in the updater 33 of FIG. 3, and the odd samples arranged in the odd sequences are predicted through the prediction process by the predictor 35 of FIG. 3. As described above, when the direction of the prediction process and the direction of the update process in the transform technique are different from each other, information of the updated even polyphase samples containing information of the odd polyphase samples to be predicted is not used, to thereby degrade the coding efficiency.

More specifically, the odd sample X(2m+2,2n+2) can be predicted in the direction of −45 degrees by the updated samples X(2m+1,2n+1) and X(2m+3,2n+3), in the direction of 0 degrees by the updated samples X(2m+2,2n+1) and X(2m+2,2n+3), and in the direction of 45 degrees by the updated samples X(2m+3,2n+1) and X(2m+1,2n+3). However, since the odd sample X(2m+2,2n+2) has had an influence on generation of the samples X(2m+2,2n+1) and X(2m+2,2n+3), information of the updated even polyphase samples containing information of the odd polyphase samples to be predicted may not be used when the odd sample X(2m+2,2n+2) is predicted by the samples X(2m+1,2n+1), X(2m+3,2n+3), X(2m+3,2n+1), and X(2m+1,2n+3), which are updated samples in the directions of −45 degrees and 45 degrees.

Therefore, such a problem as described above is solved by performing the prediction centered on the samples X(2m+2, 2n+1) and X(2m+2,2n+3), which are samples having been influenced by the X(2m+2,2n+2) during the update process, instead of the arrow directions of −45 degrees, 0 degrees, and 45 degrees. Specifically, the sample X(2m+2,2n+2) is predicted by the samples X(2m,2n+3), X(2m+1,2n+3), X(2m+2, 2n+3), X(2m+3,2n+3), and X(2m+4,2n+3), which are located at the ends of the arrows around the sample X(2m+2,2n+1). Further, the sample X(2m+2,2n+2) is predicted by the samples X(2m,2n+1), X(2m+1,2n+1), X(2m+2,2n+1), X(2m+3,2n+1), and X(2m+4,2n+1), which are located at the ends of the arrows around the sample X(2m+2,2n+3).

The optimum direction is determined by equation (2) described above. The examples described above can solve the problem of disaccord, which may occur during the update process and the prediction process. Further, the prediction method using a central pixel and samples in the directions of arrows provides a more precise directionality of 22.5 degrees in comparison with the prior art capable of expressing only three directions (including −45 degrees, 0 degrees, and 45 degrees). Of course, it is possible to further enhance the prediction efficiency by providing more directionality beyond the example of FIG. 9.

Figure 11:
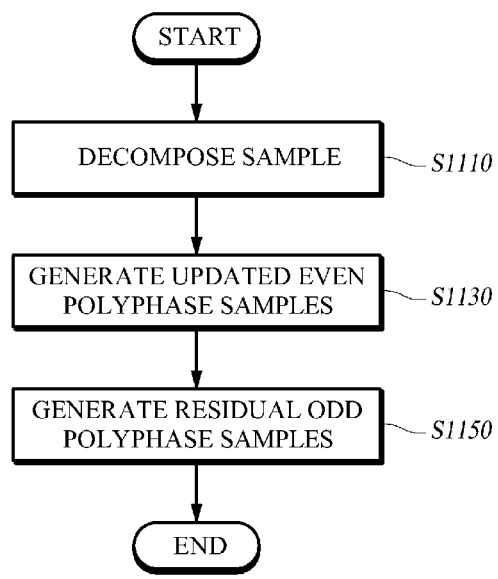
FIG. 11 is a flowchart of a wavelet transform method based on a prediction-update lifting scheme according to an aspect.

FIG. 11 is a flowchart of a wavelet transform method based on a prediction-update lifting scheme according to an aspect, which will be described hereinafter based on an application thereof to the apparatus of FIG. 3.

First, the decomposer 31 decomposes an input signal into a first even polyphase sample and a first odd polyphase sample (step S1110).

Thereafter, the updater 33 calculates a first prediction value by predicting even polyphase samples from the first odd polyphase sample, and adds the first prediction value to the first even polyphase sample, thereby obtaining an updated even polyphase sample (step S1130).

Next, the predictor 35 calculates a second prediction value by predicting odd polyphase samples from the updated even polyphase sample, and subtracts the second prediction value from the first odd polyphase sample, thereby obtaining a residual odd polyphase sample (step S1150).

Figure 12:
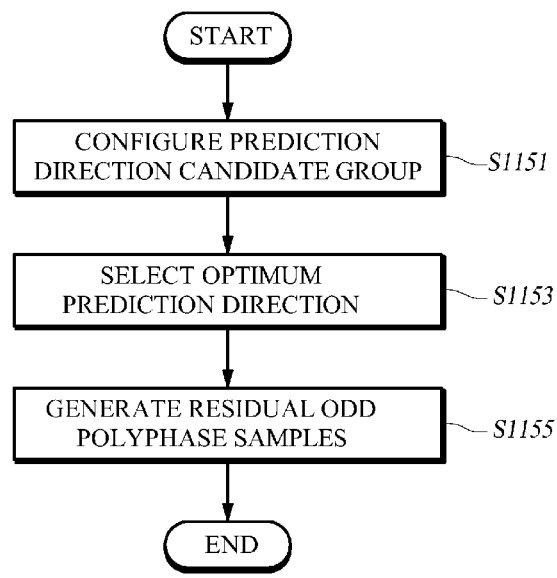
FIG. 12 is a flowchart illustrating step S1150 of FIG. 11 in more detail.

FIG. 12 is a flowchart illustrating step S1150 of FIG. 11 in more detail, which will be described hereinafter based on an application thereof to the apparatus of FIG. 5.

First, the prediction sample influence determiner 510 configures the first updated even polyphase samples from corresponding odd polyphase samples to be predicted, based on the direction of the updated filter, the coefficient of the updated filter, and locations of the corresponding odd polyphase samples to be predicted, and the prediction direction selector 530 configures a plurality of prediction direction candidate groups having 13 directional components of 0°, ±22.5°, ±45°, ±67.5°, ±112.5°, ±135°, and ±157.5° around the configured first updated even polyphase samples (step S1151).

Thereafter, the prediction direction selector 530 selects a first prediction direction for minimizing energy in a high band from the configured prediction direction candidate groups, wherein the first prediction direction is a prediction direction, in which a value obtained by subtracting an accumulated sum of products of a filter coefficient and the prediction direction candidate groups from a weighted average sample value becomes a minimum value, and the weighted average sample value refers to a value, which is obtained by giving weights according to the distances between an odd polyphase sample to be predicted and even polyphase samples located around the odd polyphase sample to the pixel values of the even polyphase samples located around the odd polyphase sample and then averaging the weighted even polyphase samples (step S1153).

Finally, the predictor 550 obtains the second prediction value based on the selected first prediction direction and the updated even polyphase samples corresponding to the first prediction direction, and subtracts the second prediction value from the first odd polyphase samples, thereby obtaining residual odd polyphase samples (step S1155).

FIG. 13 is a flowchart of a wavelet transform method based on a prediction-update lifting scheme according to another aspect, which will be described hereinafter based on an application thereof to the apparatus of FIGS. 5 to 7.

First, the prediction sample influence determiner 510 configures the first updated even polyphase samples from corresponding odd polyphase samples to be predicted, based on the direction of the update filter, the coefficient of the update filter, and locations of the corresponding odd polyphase samples to be predicted (step S1310). Specifically, the update filter identification unit 511 of the prediction sample influence determiner 510 first identifies the range of the first updated even polyphase samples based on the direction of the update filter and the coefficient of the update filter, and the update sample location calculator 513 then applies the identified range to the corresponding odd polyphase samples to be predicted, thereby determining the first updated even polyphase samples.

Next, the prediction direction selector 530 configures a plurality of prediction direction candidate groups having a plurality of directional components centered on the first updated even polyphase samples (step S1330). Specifically, the prediction direction candidate group determiner 533 of the prediction direction selector 530 configures 13 directional components of 0°, ±22.5°, ±45°, ±67.5°, ±112.5°, ±135°, and ±157.5° centered on the first updated even polyphase samples as the plurality of prediction direction candidate groups.

Thereafter, the prediction direction selector 530 selects a first prediction direction for minimizing energy in a high band from the configured prediction direction candidate groups (step S1350). Specifically, the weighted average sample predictor 531 of the prediction direction selector 530 obtains a weighted average sample value by giving weights according to the distances between an odd polyphase sample to be predicted and corresponding even polyphase samples located around the odd polyphase sample to pixel values of the even polyphase samples located around the odd polyphase sample and then averaging the weighted even polyphase samples, and the optimum prediction direction determiner 535 determines the first prediction direction based on the plurality of prediction direction candidate groups and the weighted average sample value. The first prediction direction is a prediction direction, in which a value obtained by subtracting an accumulated sum of products of a filter coefficient and the prediction direction candidate groups from the weighted average sample value becomes a minimum value.

Finally, the predictor 550 obtains a prediction value based on the first prediction direction and the updated even polyphase samples corresponding to the first prediction direction, and subtracts the prediction value from corresponding odd polyphase samples, thereby obtaining residual odd polyphase samples (step S1370).

The adaptive prediction method for effectively removing the high-band energy in the wavelet based on the prediction-update lifting scheme as described above referring to FIGS. 11 to 13 according to the present disclosure may be implemented in the form of a computer-readable code on a computer-readable recording medium. The computer-readable recording medium includes all types of recording devices in which data readable by a computer system is stored and may include, for example, ROM, RAM, CD-ROM, magnetic tapes, floppy disks, and optical data storage devices.

The recording medium further includes the cases that are implemented in the form of carrier waves (for example, in the case of transmission over the Internet). The code that can be distributed among computer systems connected via a network and can be read by computers in a distributed manner may be stored and executed.

Figure 14:
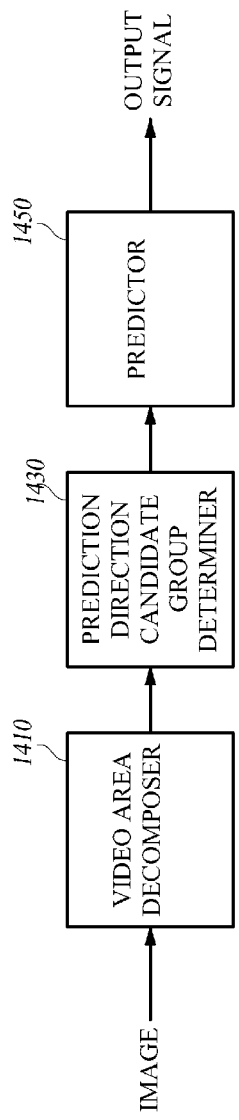
FIG. 14 is a block diagram of an adaptive prediction apparatus of a prediction-update lifting-based wavelet according to another aspect.

FIG. 14 illustrates a structure of the prediction unit 35 of FIG. 3 according to the second aspect in detail and shows a block diagram of an adaptive prediction apparatus of a prediction-update lifting-based wavelet according to another aspect.

As shown in FIG. 14, an adaptive prediction apparatus of a prediction-update lifting-based wavelet according to another aspect includes a video area divider 1410, a prediction direction candidate group determiner 1430, and a predictor 1450.

The video area divider 1410 decomposes an image into a plurality of areas. For example, an image including 256×256 pixels may be decomposed into 64 areas, each of which includes 32×32 pixels.

The prediction direction candidate group determiner 1430 selects first prediction directions for minimizing energy in the high band from a plurality of prediction direction candidate groups configured around the first updated even polyphase samples influenced at the time of updating by one or more odd polyphase samples selected in each decomposed area, and determines a final prediction direction candidate group from the selected first prediction directions based on the selection frequency. An aspect for the selection of the first prediction direction will be described in more detail later.

The predictor 1450 selects a second prediction direction for minimizing energy in the high band from the final prediction direction candidate group configured around the second updated even polyphase samples influenced at the time of updating by a corresponding odd polyphase sample to be predicted, with respect to each of all odd polyphase samples selected in each decomposed area, calculates a prediction value based on the selected second prediction direction and updated even polyphase samples corresponding to the second prediction direction, and calculates residual odd polyphase samples based on the prediction value and corresponding odd polyphase samples. An aspect for the selection of the second prediction direction will be described in more detail later.

Figure 16:
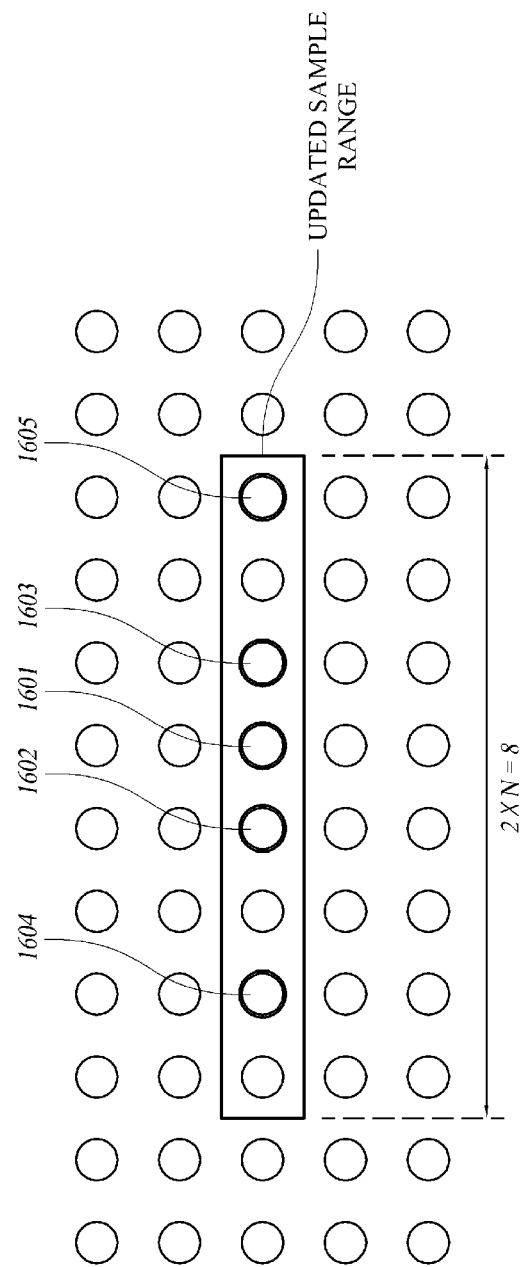
FIG. 16 is a view for illustrating the range of updated even polyphase samples usable for prediction according to an aspect.

The prediction direction candidate group determiner 1430 and the predictor 1450 identify the range of the first or second updated even polyphase samples based on the direction of the update filter, the coefficient of the update filter, and locations of corresponding odd polyphase samples. For example, as shown in FIG. 16, when the update filter direction is transverse direction and the update filter coefficient is N (N=4), the range of the first or second updated even polyphase samples has a transverse length of 2N (2N=8). Further, as shown in FIG. 16, the prediction direction candidate group determiner 1430 and the predictor 1450 apply the identified range, 2N (2N=8), to the locations of the corresponding odd polyphase samples 1601, thereby determining the updated even polyphase samples to be used for prediction, that is, the first or second updated even polyphase samples 1602 to 1605.

Figure 17:
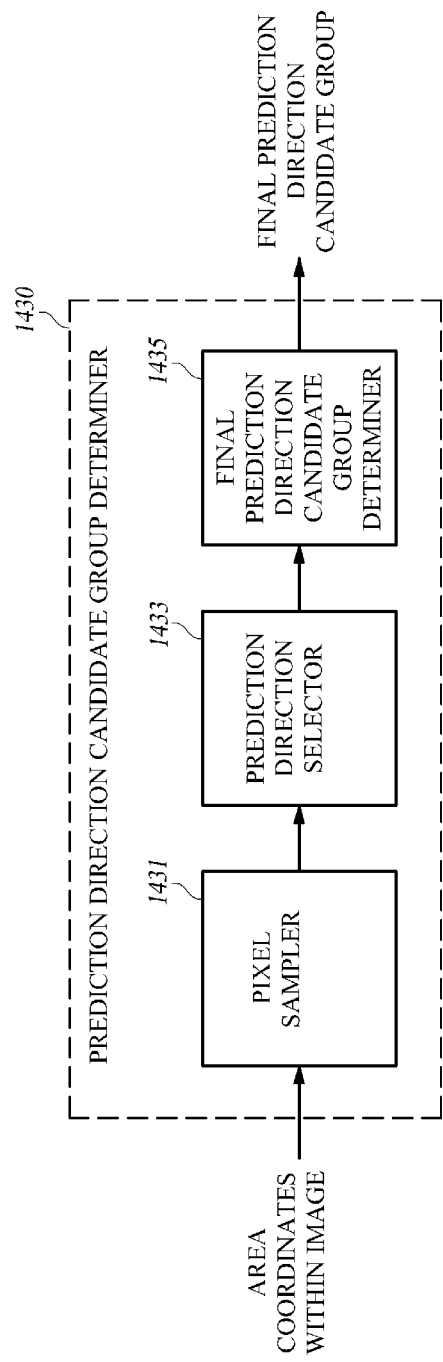
FIG. 17 is a block diagram illustrating the structure of the prediction direction candidate group determiner of FIG. 14 in detail.

FIG. 17 is a block diagram illustrating the structure of the prediction direction candidate group determiner 1430 of FIG. 14 in detail.

The prediction direction candidate group determiner 1430 includes a pixel sampler 1431, a prediction direction selector 1433, and a final prediction direction candidate group determiner 1435 as shown in FIG. 17.

The pixel sampler 1431 selects one or more odd polyphase samples 1801 in the decomposed areas each having 32×32 pixels by using a sampling technique. In the present aspect, the pixel sampler 1431 selects 49 odd polyphase samples 1801.

The prediction direction selector 1433 selects first prediction directions for minimizing energy in the high band from a plurality of prediction direction candidate groups configured around the first updated even polyphase samples influenced at the time of updating by the selected odd polyphase samples 1801.

Figure 19:
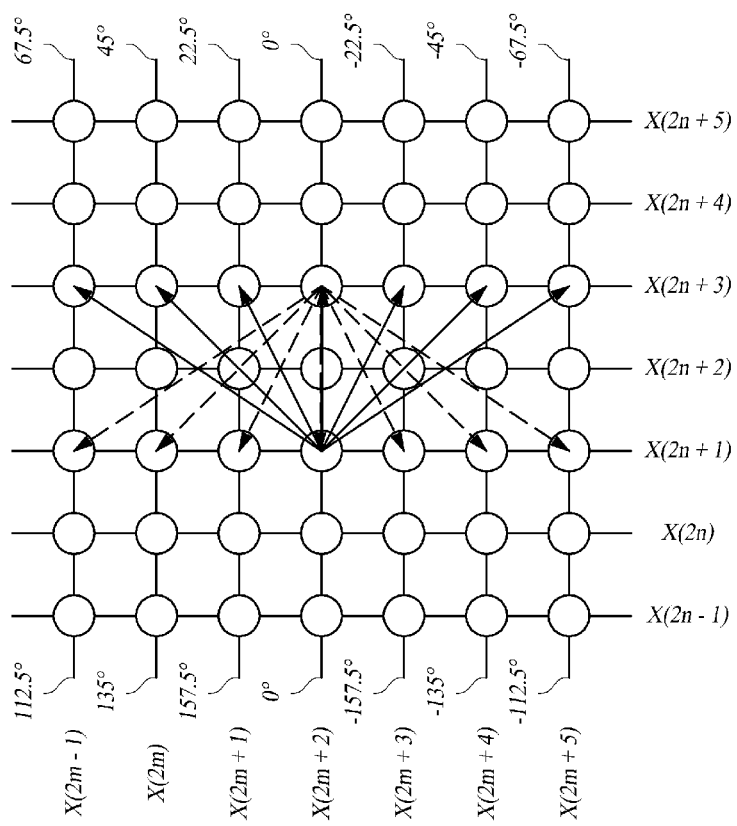
FIG. 19 is a view for illustrating a prediction direction candidate group according to an aspect.

Referring to FIG. 19, based on an assumption that the pixel X(2m+2,2n+2) of FIG. 19 is one of the selected odd polyphase samples 1801, the plurality of prediction direction candidate groups have a total of 13 directional components of 0°, ±22.5°, ±45°, ±67.5°, ±112.5°, ±135°, and ±157.5° centered on the first updated even polyphase samples (for example, samples of X(2m+2,2n+1) and X(2m+2,2n+3) in FIG. 19). Of course, the prediction direction candidate groups may have more or less than 13 directional components.

Figure 20:
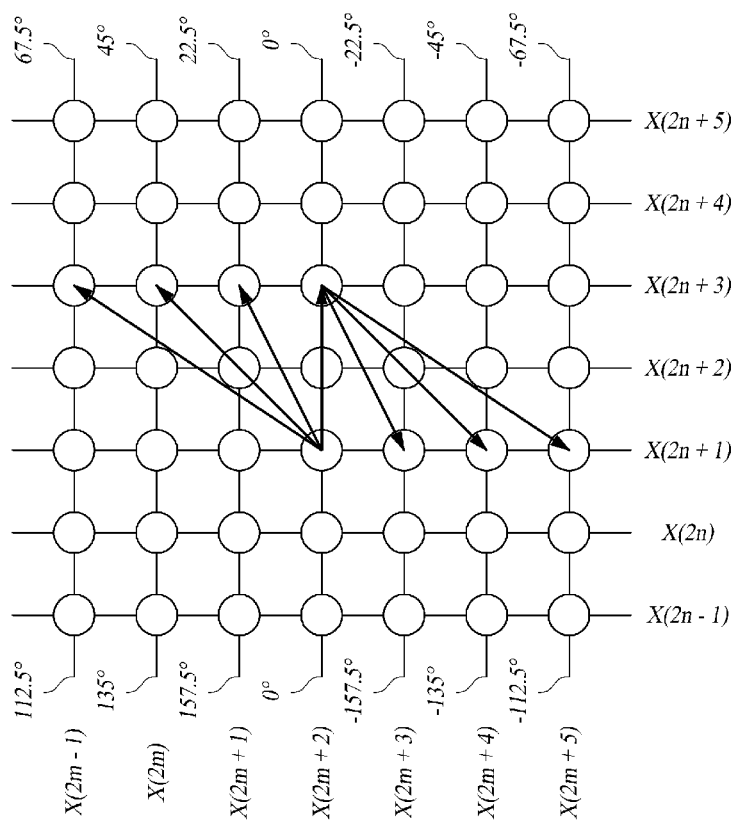
FIG. 20 is a view for illustrating a final prediction direction candidate group according to an aspect.

The final prediction direction candidate group determiner 1435 determines the final prediction direction candidate group based on the selection frequency from the selected first prediction directions in each decomposed area. That is to say, the final prediction direction candidate group determiner 1435 may determine, for example, the seven highest directional components (or prediction directions) of 67.5°, 45°, 22.5°, 0°, −112.5°, −135°, and −157.5°, which are most frequently selected among the selected 49 odd polyphase samples 1801 in the decomposed area including 32×32 pixels as shown in FIG. 20, as the final prediction direction candidate group. Although the number of directional components of the final prediction direction candidate group is seven in the present aspect, it may be determined as a number less than the number of directional components of a prediction direction candidate group. For example, it may be determined as 3~7 according to the selection frequency. Further, the prediction direction candidate group may include at least one particular directional component by default, and the particular directional component may be, for example, the directional component of 0°, which most frequently occurs in actual experiments, or at least one different directional component according to characteristics of an image. For example, since the directional component of 0° is a directional component most frequently occurring in actual experiments, the directional component of 0° may be essentially included in the prediction direction candidate group while the other directional components are selectively determined according to the selection frequency.

Hereinafter, specific aspects for selection of the first or second prediction direction according to an aspect will be described.

Figure 21:
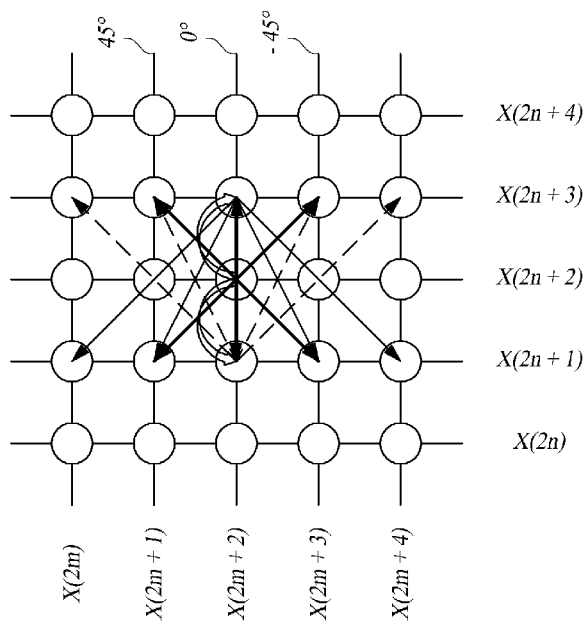
FIG. 21 is a view for illustrating a weighted average sample value according to an aspect.

Referring to FIG. 21, a weighted average value of the updated even polyphase samples located around the current to-be-predicted odd polyphase sample X(2m+2,2n+2) is generated. Specifically, the weights are calculated based on the distances from the current to-be-predicted odd polyphase sample X(2m+2,2n+2) to the neighbor updated even polyphase samples. Therefore, each of the samples X(2m+2, 2n+1), X(2m+2,2n+3) has a weight of 1 because they are spaced apart by one sample from the sample X(2m+2,2n+2), while each of the samples X(2m+1,2n+1), X(2m+1,2n+3), X(2m+3,2n+1), and X(2m+3,2n+3) has a weight of $\sqrt{2}$.

Therefore, a weighted average sample $\hat{X}[2m+2,2n+2]$ is predicted through equation (3) as defined below. In equation (3), $c_i$ indicates a weight.

$$\hat{X}[2m+2, 2n+2] = \sum_{i,j \in S} c_i X[2m+i, 2n+j] \quad \text{Equation 3}$$

An optimum prediction direction (that is, the first prediction direction or the second prediction direction) is determined based on the sample values of the plurality of prediction direction candidate groups or the final prediction direction candidate group and the weighted average sample value. The optimum prediction direction is determined by equation (4) below. According to equation (4), a prediction direction, in which a value obtained by subtracting an accumulated sum of sample values obtained by multiplying the 13 prediction direction candidate groups of FIG. 19 or the seven final prediction direction candidate groups X[2m+l,2n+j] of FIG. 20 by the filter coefficient Wi from the weighted average sample value $\hat{X}[2m+2,2n+2]$ becomes a minimum value, and is determined as the optimum prediction (that is, the first prediction direction or the second prediction direction).

$$\operatorname{argmind}(i, j) = \left| \hat{X}[2m+2, 2n+2] - \sum_{i,j} w_{i,j} X[2m+i, 2n+j] \right| \quad \text{Equation 4}$$

That is to say, according to an aspect, the coding efficiency is maximized by selecting samples capable of minimizing equation (4) in consideration of the 13 or 7 various directions.

In FIG. 21, the updated even samples arranged in the even sequences correspond to pixels generated through the update process in the updater 33 of FIG. 3, and the odd samples arranged in the odd sequences are predicted through the prediction process by the predictor 35 of FIG. 3. As described above, when the direction of the prediction process and the direction of the update process in the transform technique are different from each other, information of the updated even polyphase samples containing information of the odd polyphase samples to be predicted is not used, to thereby degrade the coding efficiency.

More specifically, the odd sample X(2m+2,2n+2) can be predicted in the direction of −45 degrees by the updated samples X(2m+1,2n+1) and X(2m+3,2n+3), in the direction of 0 degrees by the updated samples X(2m+2,2n+1) and X(2m+2,2n+3), and in the direction of 45 degrees by the updated samples X(2m+3,2n+1) and X(2m+1,2n+3). However, since the odd sample X(2m+2,2n+2) has had an influence on the generation of the samples X(2m+2,2n+1) and X(2m+2,2n+3) in the update process, information of the updated even polyphase samples containing information of the odd polyphase samples to be predicted may not be used when the odd sample X(2m+2,2n+2) is predicted by the samples X(2m+1,2n+1), X(2m+3,2n+3), X(2m+3,2n+1), and X(2m+1,2n+3), which are updated samples in the directions of −45 degrees and 45 degrees.

Therefore, such a problem as described above is solved by performing the prediction centered on the samples X(2m+2, 2n+1) and X(2m+2,2n+3), which are samples having been influenced by the X(2m+2,2n+2) during the update process, instead of the arrow directions of −45 degrees, 0 degrees, and 45 degrees. The sample X(2m+2,2n+2) is predicted by the samples X(2m,2n+3), X(2m+1,2n+3), X(2m+2, 2n+3), X(2m+3,2n+3), and X(2m+4,2n+3), which are located at the ends of the arrows around the sample X(2m+2,2n+1). Further, the sample X(2m+2,2n+2) is predicted by the samples X(2m,2n+1), X(2m+1,2n+1), X(2m+2,2n+1), X(2m+3,2n+1), and X(2m+4,2n+1), which are located at the ends of the arrows around the sample X(2m+2,2n+3).

The optimum direction is determined by equation (4). The examples described above can solve the problem of disaccord, which may occur during the update process and the prediction process. Further, the prediction method using a central pixel and samples in the directions of arrows provides a more precise directionality of 22.5 degrees beyond the prior art capable of expressing only three directions (including −45 degrees, 0 degrees, and 45 degrees). Of course, it is possible to further enhance the prediction efficiency by providing more directionality beyond the example of FIG. 21.

Figure 22:
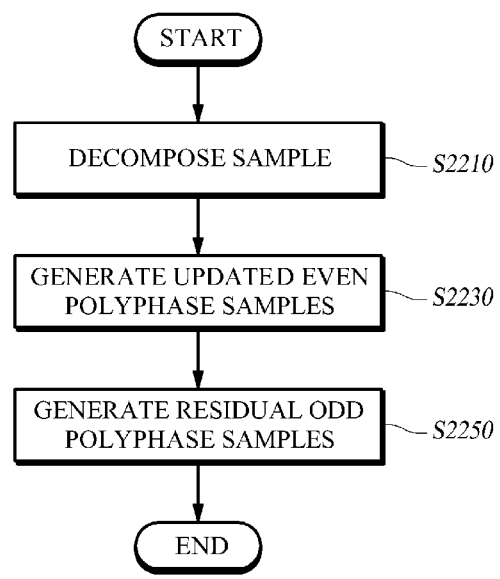
FIG. 22 is a flowchart of a wavelet transform method based on a prediction-update lifting scheme according to another aspect.

FIG. 22 is a flowchart of a wavelet transform method based on a prediction-update lifting scheme according to another aspect, which will be described hereinafter based on an application thereof to the apparatus of FIG. 3.

First, the decomposer 31 decomposes an input signal into a first even polyphase sample and a first odd polyphase sample (step S2210).

Then, the updater 33 calculates a first prediction value by predicting even polyphase samples from the first odd polyphase sample, and adds the first prediction value to the first even polyphase sample, thereby obtaining an updated even polyphase sample (step S2230).

Next, the predictor 35 calculates a second prediction value by predicting odd polyphase samples from the updated even polyphase sample, and subtracts the second prediction value from the first odd polyphase sample, thereby obtaining a residual odd polyphase sample (step S2250).

Figure 23:
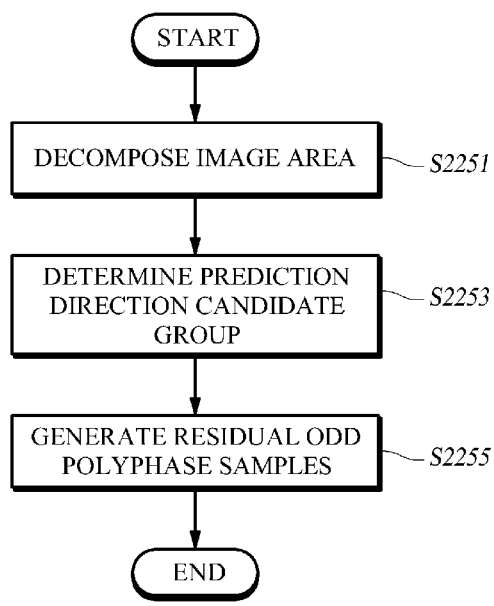
FIG. 23 is a flowchart illustrating step S2250 of FIG. 22 in more detail.

FIG. 23 is a flowchart illustrating step S2250 of FIG. 22 in more detail, which will be described hereinafter based on an application thereof to the apparatus of FIG. 14.

Figure 15:
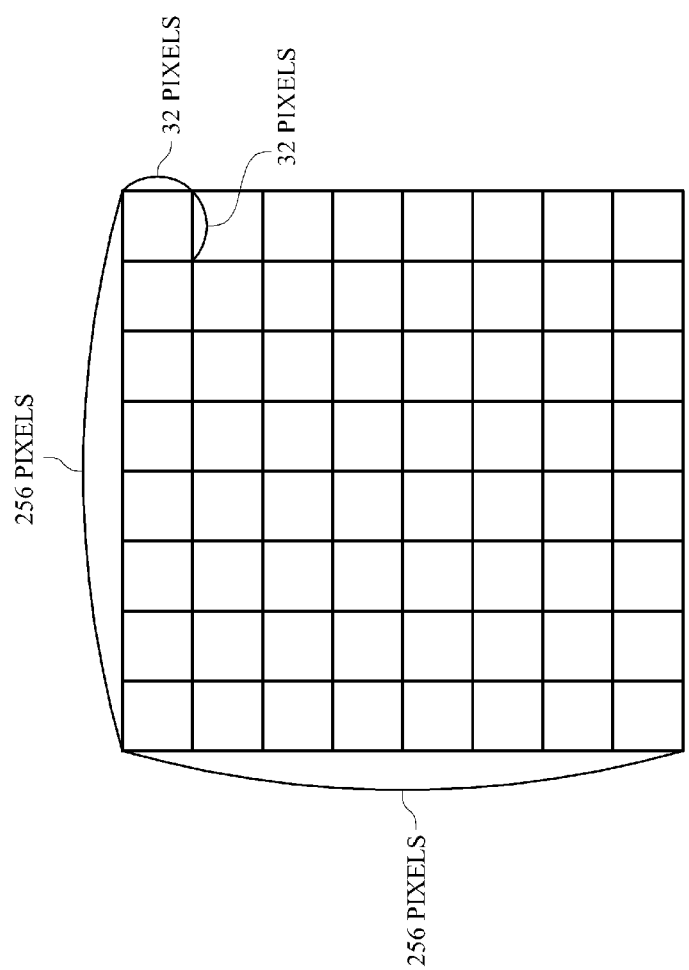
FIG. 15 is a view for illustrating a method of decomposing an image area according to an aspect.

First, the video area decomposer 1410 decomposes an image into a specific number of areas (step S2251). That is, as shown in FIG. 15, an image including 256×256 pixels may be decomposed into 64 areas, each of which includes 32×32 pixels.

Figure 18:
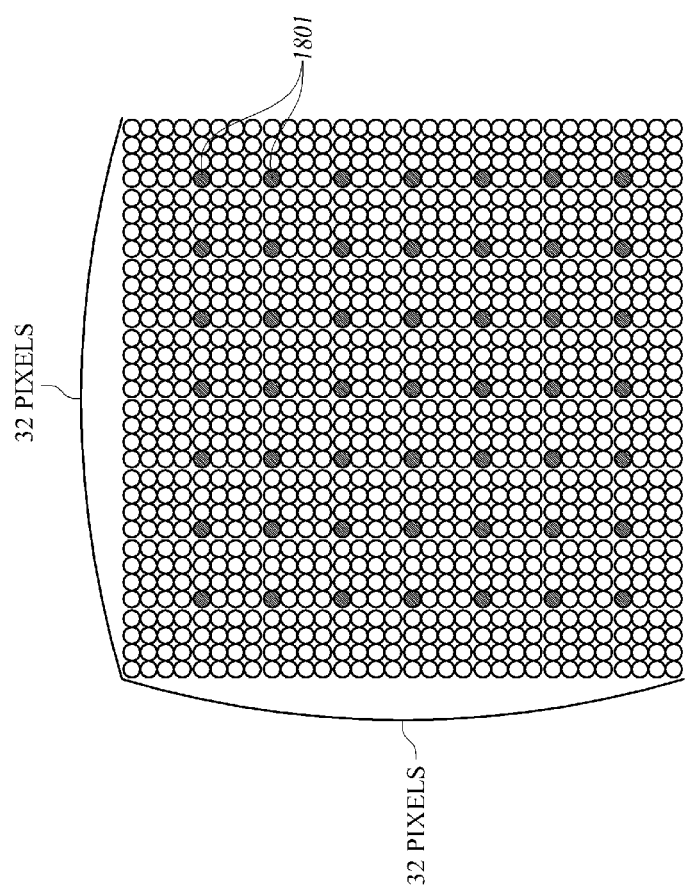
FIG. 18 is a view for illustrating a method of selecting sample pixels in decomposed areas according to an aspect.

Next, as shown in FIG. 18, the prediction direction candidate group determiner 1430 selects 49 odd polyphase samples 1801 in each decomposed area having 32×32 pixels by using a sampling method, selects the first prediction direction for minimizing energy in the high band from a plurality of prediction direction candidate groups configured around the first updated even polyphase samples influenced at the time of updating from the selected odd polyphase samples 1801, and determines a final prediction direction candidate group from the selected first prediction directions based on the selection frequency (step S2253). The above description can be referred to in configuration of the first updated even polyphase samples and selection of the first prediction direction.

Finally, a second prediction direction for minimizing energy in the high band is selected from the final prediction direction candidate group configured around the second updated even polyphase samples influenced at the time of updating by a corresponding odd polyphase sample to be predicted, with respect to each of all odd polyphase samples selected in each decomposed area, a second prediction value is calculated based on the selected second prediction direction and updated even polyphase samples corresponding to the second prediction direction, and the second prediction value is subtracted from the odd polyphase sample to be predicted, so that a residual odd polyphase sample is obtained (step S2255). The above description can be referred to in configuration of the second updated even polyphase samples and selection of the second prediction direction.

Figure 24:
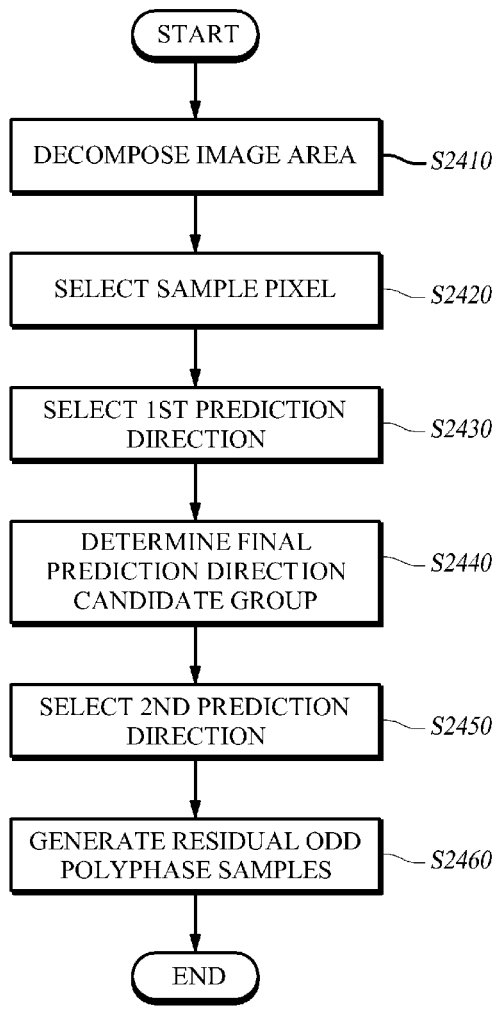
FIG. 24 is a flowchart of an adaptive prediction method using wavelet transform based on a prediction-update lifting scheme according to another aspect.

FIG. 24 is a flowchart of a wavelet transform method based on a prediction-update lifting scheme according to another aspect, which will be described hereinafter based on an application thereof to the apparatus of FIGS. 14 to 17.

The video area divider 1410 decomposes an image into a plurality of areas (step S2410). For example, as shown in FIG. 15, an image including 256×256 pixels may be decomposed into 64 areas, each of which includes 32×32 pixels.

Next, as shown in FIG. 18, the pixel sampler 1431 of the prediction direction candidate group determiner 1430 selects 49 odd polyphase samples 1801 in each decomposed area having 32×32 pixels by using a sampling method (step S2420).

Thereafter, the prediction direction selector 1433 of the prediction direction candidate group determiner 1430 selects the first prediction direction for minimizing energy in the high band from a plurality of prediction direction candidate groups configured around the first updated even polyphase samples influenced at the time of updating by the selected odd polyphase samples (step S2430). That is, the prediction direction selector 1433 configures first updated even polyphase samples influenced at the time of updating as described above with reference to FIG. 16 for each of the 49 selected odd polyphase samples 1801, configures a plurality of prediction direction candidate groups having 13 directional components centered on the configured first updated even polyphase samples, and selects the first prediction direction for minimizing the energy in the high band from corresponding samples of the configured prediction direction candidate groups. The above description can be referred to for a method for configuring the first updated even polyphase samples and selecting the first prediction direction.

Next, the final prediction direction candidate group determiner 1435 of the prediction direction candidate group determiner 1430 determines the seven highest directional components (or prediction directions) of 67.5°, 45°, 22.5°, 0°, −112.5°, −135°, and −157.5°, which are most frequently selected among the 49 selected first prediction directions for the 49 selected odd polyphase samples 1801 in the decomposed area including 32×32 pixels, as the final prediction direction candidate group (step S2440).

Then, the predictor 1450 configures second updated even polyphase samples influenced at the time of updating by a corresponding odd polyphase sample to be predicted for each of all the odd polyphase samples in each decomposed area, and selects a second prediction direction for minimizing energy in the high band from the final prediction direction candidate group configured around the second updated even polyphase samples (step S2450). The above description can be referred to for a specific method for configuring the second updated even polyphase samples and a specific method for selecting the second prediction direction.

Finally, the predictor 1450 obtains a prediction value based on the selected second prediction direction and the updated even polyphase samples corresponding to the second prediction direction, and subtracts the prediction value from corresponding odd polyphase samples to be predicted, thereby obtaining residual odd polyphase samples (step S2460).

The adaptive prediction method for effectively removing the high-band energy in the wavelet based on the prediction-update lifting scheme as described referring to FIGS. 22 to 24 according to the present disclosure may be implemented in the form of a computer-readable code on a computer-readable recording medium. The computer-readable recording medium includes all types of recording devices in which data readable by a computer system is stored and may include, for example, ROM, RAM, CD-ROM, magnetic tapes, floppy disks, and optical data storage devices.

Further, the recording medium further includes the cases that are implemented in the form of carrier waves (for example, in the case of transmission over the Internet). The code that can be distributed among computer systems connected via a network and can be read by computers in a distributed manner may be stored and executed.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

According to the disclosure as described above, when applied to the wavelet transform-based video data compression technique in the field of large-amount video data compression technology, the present disclosure effectively removes energy of the high-band signals when removing a spatial correlation between images by using wavelet transform that is designed based on the prediction-update lifting scheme, and hence increases the video coding efficiency. Furthermore, when applied to the wavelet transform-based video data compression technique in the field of large-amount video data compression technology, the present disclosure effectively removes energy of the high-band signals when removing a spatial correlation between images by using wavelet transform that is designed based on the prediction-update lifting scheme, and hence increases the video coding efficiency while decreasing the calculation quantity.

The invention claimed is:

1. A wavelet transform apparatus based on a prediction-update lifting scheme, comprising:
a decomposer for decomposing an input signal into first even polyphase samples and first odd polyphase samples;
an updater for calculating a first prediction value by predicting even polyphase samples from the first odd polyphase samples and calculating updated even polyphase samples based on the first prediction value and the first even polyphase samples; and
a predictor for calculating a second prediction value by predicting odd polyphase samples from the updated even polyphase samples and calculating residual odd polyphase samples based on the second prediction value and the first odd polyphase samples,
wherein the predictor configures a plurality of prediction direction candidate groups centered at first updated even polyphase samples influenced when being updated from a corresponding odd polyphase sample to be predicted, selects a first prediction direction for minimizing energy in a high band from a plurality of configured prediction direction candidate groups, and calculates the second prediction value based on selected first prediction direction and updated even polyphase samples corresponding to the first prediction direction.

2. A wavelet transform apparatus based on a prediction-update lifting scheme, comprising:
a decomposer for decomposing an input signal into first even polyphase samples and first odd polyphase samples;
an updater for calculating a first prediction value by predicting even polyphase samples from the first odd polyphase samples and calculating updated even polyphase samples based on the first prediction value and the first even polyphase samples; and
a predictor for calculating a second prediction value by predicting odd polyphase samples from the updated even polyphase samples and calculating residual odd polyphase samples based on the second prediction value and the first odd polyphase samples,
wherein the predictor decomposes an image into a predetermined number of decomposed areas, selects one or more odd polyphase samples in each of the decomposed areas, selects first prediction directions for minimizing energy in a high band from a plurality of prediction direction candidate groups configured around first updated even polyphase samples influenced when being updated from selected odd polyphase samples, determines a final prediction direction candidate group from selected first prediction directions based on a selection frequency, selects a second prediction direction for minimizing energy in the high band from the final prediction direction candidate group configured around the second updated even polyphase samples influenced when being updated from a corresponding odd polyphase sample to be predicted, with respect to each of all odd polyphase samples in each decomposed area, and calculates the second prediction value based on selected second prediction direction and updated even polyphase samples corresponding to the second prediction direction.

3. The wavelet transform apparatus of claim 1, wherein the predictor configures the first or second updated even polyphase samples based on a direction of an update filter, a coefficient of the update filter, and locations of corresponding odd polyphase samples to be predicted.

4. The wavelet transform apparatus of claim 1, wherein the plurality of prediction direction candidate groups have directional components of 0°, ±22.5°, ±45°, ±67.5°, ±112.5°, ±135°, and ±157.5° centered on the first updated even polyphase samples.

5. The wavelet transform apparatus of claim 1, wherein the predictor selects a prediction direction, in which a value obtained by subtracting an accumulated sum of products of a corresponding filter coefficient and the prediction direction candidate group from a weighted average sample value becomes a minimum value, as the first prediction direction or the second prediction direction.

6. The wavelet transform apparatus of claim 5, wherein the weighted average sample value is a value, which is obtained by giving weights according to the distances between an odd polyphase sample to be predicted and corresponding even polyphase samples located around the odd polyphase sample to the pixel values of the even polyphase samples located around the odd polyphase sample and then averaging the weighted even polyphase samples.

7. The wavelet transform apparatus of claim 2, wherein the number of prediction directions of the final prediction direction candidate group is smaller than the number of prediction directions of the prediction direction candidate group.

8. The wavelet transform apparatus of claim 7, wherein the final prediction direction candidate group comprises at least one particular directional component by default.

9. A wavelet transform method based on a prediction-update lifting scheme, comprising:
   decomposing an input signal into first even polyphase samples and first odd polyphase samples;
   calculating a first prediction value by predicting even polyphase samples from the first odd polyphase samples and calculating updated even polyphase samples based on the first prediction value and the first even polyphase samples; and
   calculating a second prediction value by predicting odd polyphase samples from the updated even polyphase samples and calculating residual odd polyphase samples based on the second prediction value and the first odd polyphase samples,
   wherein the step of calculating the second prediction value and the residual odd polyphase samples comprises:
   configuring a plurality of prediction direction candidate groups centered at first updated even polyphase samples influenced when being updated from a corresponding odd polyphase sample to be predicted;
   selecting a first prediction direction for minimizing energy in a high band from a plurality of configured prediction direction candidate groups; and
   calculating the second prediction value based on selected first prediction direction and updated even polyphase samples corresponding to the first prediction direction.

10. A wavelet transform method based on a prediction-update lifting scheme, comprising:
   decomposing an input signal into first even polyphase samples and first odd polyphase samples;
   calculating a first prediction value by predicting even polyphase samples from the first odd polyphase samples and calculating updated even polyphase samples based on the first prediction value and the first even polyphase samples; and
   calculating a second prediction value by predicting odd polyphase samples from the updated even polyphase samples and calculating residual odd polyphase samples based on the second prediction value and the first odd polyphase samples,
   wherein the step of calculating the second prediction value and the residual odd polyphase samples comprises:
   decomposing an image into a predetermined number of decomposed areas;
   selecting one or more odd polyphase samples in each of the decomposed areas, selecting first prediction directions for minimizing energy in a high band from a plurality of prediction direction candidate groups configured around first updated even polyphase samples influenced when being updated from selected odd polyphase samples, and determining a final prediction direction candidate group from selected first prediction directions based on a selection frequency; and
   selecting a second prediction direction for minimizing energy in the high band from the final prediction direction candidate group configured around the second updated even polyphase samples influenced when being updated from a corresponding odd polyphase sample to be predicted, with respect to each of all odd polyphase samples in each decomposed area, and calculating the second prediction value based on selected second prediction direction and updated even polyphase samples corresponding to the second prediction direction.

11. The wavelet transform method of claim 9, wherein the first or second updated even polyphase samples are configured based on a direction of an update filter, a coefficient of the update filter, and locations of corresponding odd polyphase samples to be predicted.

12. The wavelet transform method of claim 9, wherein the plurality of prediction direction candidate groups have directional components of 0°, ±22.5°, ±45°, ±67.5°, ±112.5°, ±135°, and ±157.5° centered on the first updated even polyphase samples.

13. The wavelet transform method of claim 9, wherein the first prediction direction or the second prediction direction is a prediction direction, in which a value obtained by subtracting an accumulated sum of products of a corresponding filter coefficient and the prediction direction candidate group from a weighted average sample value becomes a minimum value.

14. The wavelet transform method of claim 13, wherein the weighted average sample value is a value, which is obtained by giving weights according to the distances between an odd polyphase sample to be predicted and corresponding even polyphase samples located around the odd polyphase sample to the pixel values of the even polyphase samples located around the odd polyphase sample and then averaging the weighted even polyphase samples.

15. The wavelet transform method of claim 10, wherein the number of prediction directions of the final prediction direction candidate group is smaller than the number of prediction directions of the prediction direction candidate group.

16. The wavelet transform method of claim 15, wherein the final prediction direction candidate group comprises at least one particular directional component by default.

17. An adaptive prediction apparatus for predicting an odd polyphase sample from updated even polyphase samples by a wavelet transform based on a prediction-update lifting scheme, comprising:
   a prediction sample influence determiner for configuring first updated even polyphase samples influenced when being updated from an odd polyphase sample to be predicted;
   a prediction direction selector for configuring plural prediction direction candidate groups centered on the first updated even polyphase samples and selecting a first prediction direction for minimizing energy in a high band from configured plural prediction direction candidate groups; and
   a predictor for calculating a first prediction value based on the first prediction direction and updated even polyphase samples corresponding to the first prediction direction and calculating residual odd polyphase samples based on the first prediction value and corresponding odd polyphase samples.

18. The adaptive prediction apparatus of claim 17, wherein the prediction sample influence determiner comprises:
   an update filter identification unit for identifying a range of the first updated even polyphase samples based on a direction of an update filter and a coefficient of the update filter; and
   an update sample location calculator for applying the identified range to locations of corresponding odd polyphase samples to be predicted, thereby determining the first updated even polyphase samples.

19. The adaptive prediction apparatus of claim 17, wherein the prediction direction selector comprises:
   a weighted average sample predictor for obtaining a weighted average sample value by giving weights according to distances between an odd polyphase sample to be predicted and corresponding even polyphase samples located around the odd polyphase sample to pixel values of the even polyphase samples located around the odd polyphase sample and then averaging the weighted even polyphase samples;

a prediction direction candidate group determiner for configuring plural prediction direction candidate groups having multiple directional components around the first updated even polyphase samples; and an optimum prediction direction determiner for determining the first prediction direction based on the plural prediction direction candidate groups and the weighted average sample value.

20. The adaptive prediction apparatus of claim 19, wherein the multiple directional components comprise directional components of 0°, ±22.5°, ±45°, ±67.5°, ±112.5°, ±135°, and ±157.5°.

21. The adaptive prediction apparatus of claim 19, wherein the first prediction direction is a prediction direction, in which a value obtained by subtracting an accumulated sum of products of a filter coefficient and the plural prediction direction candidate groups from the weighted average sample value becomes a minimum value.

22. An adaptive prediction apparatus for predicting an odd polyphase sample from updated even polyphase samples by a wavelet transform based on a prediction-update lifting scheme, comprising:

a video area divider for decomposing an image into a plurality of decomposed areas;

a prediction direction candidate group determiner for selecting first prediction directions for minimizing energy in the high band from a plurality of prediction direction candidate groups configured around first updated even polyphase samples influenced when being updated from one or more odd polyphase samples selected in each of the decomposed areas, and determining a final prediction direction candidate group from selected first prediction directions based on a selection frequency; and a predictor for selecting a second prediction direction for minimizing energy in the high band from the final prediction direction candidate group configured around the second updated even polyphase samples influenced when being updated from a corresponding odd polyphase sample to be predicted, with respect to each of all odd polyphase samples in each of the decomposed areas, calculating a first prediction value based on selected second prediction direction and updated even polyphase samples corresponding to the second prediction direction, and calculating residual odd polyphase samples based on the first prediction value and corresponding odd polyphase samples.

23. The adaptive prediction apparatus of claim 22, wherein the prediction direction candidate group determiner comprises:

a pixel sampler for selecting one or more odd polyphase samples in each of the decomposed areas;

a prediction direction selector for selecting first prediction directions for minimizing energy in a high band from the plurality of prediction direction candidate groups configured around the first updated even polyphase samples influenced when being updated from selected odd polyphase samples; and a final prediction direction candidate group determiner for determining the final prediction direction candidate group based on a selection frequency from selected first prediction directions in each of the decomposed areas.

24. The adaptive prediction apparatus of claim 22, wherein the plurality of prediction direction candidate groups have directional components of 0°, ±22.5°, ±45°, ±67.5°, ±112.5°, ±135°, and ±157.5° centered on selected updated even polyphase samples.

25. The adaptive prediction apparatus of claim 22, wherein the number of prediction directions of the final prediction direction candidate group is smaller than the number of prediction directions of the prediction direction candidate group.

26. The adaptive prediction apparatus of claim 25, wherein the final prediction direction candidate group comprises at least one particular directional component by default.

27. An adaptive prediction method for predicting an odd polyphase sample from updated even polyphase samples by a wavelet transform based on a prediction-update lifting scheme, comprising:

configuring first updated even polyphase samples influenced when being updated from an odd polyphase sample to be predicted;

configuring plural prediction direction candidate groups centered on the first updated even polyphase samples;

selecting a first prediction direction for minimizing energy in a high band from configured plural prediction direction candidate groups; and calculating a first prediction value based on the first prediction direction and updated even polyphase samples corresponding to the first prediction direction and calculating residual odd polyphase samples based on the first prediction value and corresponding odd polyphase samples.

28. The adaptive prediction method of claim 27, wherein the first updated even polyphase samples are configured based on a direction of an update filter, a coefficient of the update filter, and locations of corresponding odd polyphase samples to be predicted.

29. The adaptive prediction method of claim 27, wherein the plurality of prediction direction candidate groups have directional components of 0°, ±22.5°, ±45°, ±67.5°, ±112.5°, ±135°, and ±157.5° centered on the first updated even polyphase samples.

30. The adaptive prediction method of claim 27, wherein the first prediction direction is a prediction direction, in which a value obtained by subtracting an accumulated sum of products of a corresponding filter coefficient and the prediction direction candidate group from a weighted average sample value becomes a minimum value.

31. The adaptive prediction method of claim 30, wherein the weighted average sample value is a value, which is obtained by giving weights according to distances between an odd polyphase sample to be predicted and corresponding even polyphase samples located around the odd polyphase sample to pixel values of the even polyphase samples located around the odd polyphase sample and then averaging the weighted even polyphase samples.

32. An adaptive prediction method for predicting an odd polyphase sample from updated even polyphase samples by a wavelet transform based on a prediction-update lifting scheme, comprising:

decomposing an image into a plurality of decomposed areas;

selecting one or more odd polyphase samples in each of the decomposed areas;

selecting first prediction directions for minimizing energy in a high band from a plurality of prediction direction candidate groups configured around first updated even polyphase samples influenced when being updated from selected one or more odd polyphase samples;

determining a final prediction direction candidate group from selected first prediction directions based on a selection frequency;

selecting a second prediction direction for minimizing energy in the high band from the final prediction direction candidate group configured around the second updated even polyphase samples influenced when being updated from a corresponding odd polyphase sample to be predicted, with respect to each of all odd polyphase samples in each of the decomposed areas;

calculating a first prediction value based on selected second prediction direction and updated even polyphase samples corresponding to the second prediction direction; and calculating residual odd polyphase samples based on the first prediction value and corresponding odd polyphase samples.

33. The adaptive prediction method of claim 32, wherein the first prediction direction or the second prediction direction is a prediction direction, in which a value obtained by subtracting an accumulated sum of products of a corresponding filter coefficient and the prediction direction candidate group from a weighted average sample value becomes a minimum value.

34. The adaptive prediction method of claim 33, wherein the weighted average sample value is a value, which is obtained by giving weights according to distances between an odd polyphase sample to be predicted and corresponding even polyphase samples located around the odd polyphase sample to pixel values of the even polyphase samples located around the odd polyphase sample and then averaging the weighted even polyphase samples.

35. The adaptive prediction method of claim 32, wherein the number of prediction directions of the final prediction direction candidate group is smaller than the number of prediction directions of the prediction direction candidate group.

36. A non-transitory computer-readable recording medium recording a program for implementing adaptive prediction functions for predicting an odd polyphase sample from updated even polyphase samples by a wavelet transform based on a prediction-update lifting scheme, the adaptive prediction functions comprising:

configuring first updated even polyphase samples influenced when being updated from an odd polyphase sample to be predicted;

configuring plural prediction direction candidate groups centered on the first updated even polyphase samples;

selecting a first prediction direction for minimizing energy in a high band from configured plural prediction direction candidate groups; and calculating a first prediction value based on the first prediction direction and updated even polyphase samples corresponding to the first prediction direction and calculating residual odd polyphase samples based on the first prediction value and corresponding odd polyphase samples.

37. A non-transitory computer-readable recording medium recording a program for implementing adaptive prediction functions for predicting an odd polyphase sample from updated even polyphase samples by a wavelet transform based on a prediction-update lifting scheme, the adaptive prediction functions comprising:

decomposing an image into a predetermined number of decomposed areas;

selecting one or more odd polyphase samples in each of the decomposed areas, selecting first prediction directions for minimizing energy in a high band from a plurality of prediction direction candidate groups configured around first updated even polyphase samples influenced when being updated from selected one or more odd polyphase samples, and determining a final prediction direction candidate group from selected first prediction directions based on a selection frequency; and selecting a second prediction direction for minimizing energy in the high band from the final prediction direction candidate group configured around the second updated even polyphase samples influenced when being updated from a corresponding odd polyphase sample to be predicted, with respect to each of all odd polyphase samples in each of the decomposed areas, calculating a first prediction value based on selected second prediction direction and updated even polyphase samples corresponding to the second prediction direction, and calculating residual odd polyphase samples based on the first prediction value and corresponding odd polyphase samples.

38. The wavelet transform apparatus of claim 2, wherein the predictor configures the first or second updated even polyphase samples based on a direction of an update filter, a coefficient of the update filter, and locations of corresponding odd polyphase samples to be predicted.

39. The wavelet transform apparatus of claim 2, wherein the plurality of prediction direction candidate groups have directional components of $0°$, $±22.5°$, $±45°$, $±67.5°$, $±112.5°$, $±135°$, and $±157.5°$ centered on the first updated even polyphase samples.

40. The wavelet transform apparatus of claim 2, wherein the predictor selects a prediction direction, in which a value obtained by subtracting an accumulated sum of products of a corresponding filter coefficient and the prediction direction candidate group from a weighted average sample value becomes a minimum value, as the first prediction direction or the second prediction direction.

41. The wavelet transform apparatus of claim 40, wherein the weighted average sample value is a value, which is obtained by giving weights according to the distances between an odd polyphase sample to be predicted and corresponding even polyphase samples located around the odd polyphase sample to the pixel values of the even polyphase samples located around the odd polyphase sample and then averaging the weighted even polyphase samples.

42. The wavelet transform method of claim 10, wherein the first or second updated even polyphase samples are configured based on a direction of an update filter, a coefficient of the update filter, and locations of corresponding odd polyphase samples to be predicted.

43. The wavelet transform method of claim 10, wherein the plurality of prediction direction candidate groups have directional components of $0°$, $±22.5°$, $±45°$, $±67.5°$, $±112.5°$, $±135°$, and $±157.5°$ centered on the first updated even polyphase samples.

44. The wavelet transform method of claim 10, wherein the first prediction direction or the second prediction direction is a prediction direction, in which a value obtained by subtracting an accumulated sum of products of a corresponding filter coefficient and the prediction direction candidate group from a weighted average sample value becomes a minimum value.

45. The wavelet transform method of claim 44, wherein the weighted average sample value is a value, which is obtained by giving weights according to the distances between an odd polyphase sample to be predicted and corresponding even polyphase samples located around the odd polyphase sample to the pixel values of the even polyphase samples located around the odd polyphase sample and then averaging the weighted even polyphase samples.

* * * * *